US012581109B2

(12) United States Patent
Park et al.

(10) Patent No.: US 12,581,109 B2
(45) Date of Patent: **\*Mar. 17, 2026**

(54) METHOD FOR ENCODING AND DECODING IMAGE INFORMATION AND DEVICE USING SAME

(71) Applicant: LG ELECTRONICS INC., Seoul (KR)

(72) Inventors: Seungwook Park, Seoul (KR); Jaehyun Lim, Seoul (KR); Yongjoon Jeon, Seoul (KR); Hendry Hendry, Seoul (KR); Younghee Chol, Seoul (KR); Jaewon Sung, Seoul (KR); Jungsun Kim, Seoul (KR); Byeongmoon Jeon, Seoul (KR); Joonyoung Park, Seoul (KR)

(73) Assignee: LG ELECTRONICS INC., Seoul (KR)

( \* ) Notice: Subject to any disclaimer, the term of this patent is extended or adjusted under 35 U.S.C. 154(b) by 105 days.

This patent is subject to a terminal disclaimer.

(21) Appl. No.: 18/379,344

(22) Filed: Oct. 12, 2023

(65) Prior Publication Data

US 2024/0048752 A1 Feb. 8, 2024

Related U.S. Application Data

(63) Continuation of application No. 17/377,203, filed on Jul. 15, 2021, now Pat. No. 11,825,110, which is a
(Continued)

(51) Int. Cl.
H04N 19/513 (2014.01)
H04N 19/105 (2014.01)
(Continued)

(52) U.S. Cl.
CPC ......... H04N 19/513 (2014.11); H04N 19/105 (2014.11); H04N 19/11 (2014.11);
(Continued)

(58) Field of Classification Search
CPC .... H04N 19/513; H04N 19/105; H04N 19/11; H04N 19/139; H04N 19/176;
(Continued)

(56) References Cited

U.S. PATENT DOCUMENTS

2012/0008688 A1\* 1/2012 Tsai ..................... H04N 19/176
375/E7.125
2012/0189062 A1\* 7/2012 Sugio ................... H04N 19/109
375/E7.123

FOREIGN PATENT DOCUMENTS

WO WO-2011127966 A1 \* 10/2011 ............. H04N 19/70

OTHER PUBLICATIONS

Wiegand et al. "WD3: Working Draft 3 of High-Efficiency Video Coding," ITU-T SG16 WP3 and ISO/IEC JTC1/SC29/WG11, JCTVC-E603, Mar. 2011, 215 pages.

\* cited by examiner

*Primary Examiner* — Francis Geroleo
(74) *Attorney, Agent, or Firm* — Bryan Cave Leighton Paisner LLP

(57) ABSTRACT

The present invention relates to the encoding and decoding of image information. According to the present invention, the decoding method comprises the steps of: entropy-decoding received information; performing inter prediction on a current block based on the entropy-decoded information; and restoring images by using the prediction results, wherein, in the inter prediction step, a skip mode or merge mode is applied to the current block and movement information of the current block may be determined based on the
(Continued)

movement information of a neighboring block of the current block.

2 Claims, 12 Drawing Sheets

Related U.S. Application Data continuation of application No. 16/893,093, filed on Jun. 4, 2020, now Pat. No. 11,102,502, which is a continuation of application No. 16/256,533, filed on Jan. 24, 2019, now Pat. No. 10,715,825, which is a continuation of application No. 15/883,280, filed on Jan. 30, 2018, now Pat. No. 10,257,535, which is a continuation of application No. 14/692,147, filed on Apr. 21, 2015, now Pat. No. 9,918,101, which is a continuation of application No. 13/977,144, filed as application No. PCT/KR2012/000170 on Jan. 6, 2012, now Pat. No. 9,924,188.

(60) Provisional application No. 61/543,296, filed on Oct. 4, 2011, provisional application No. 61/449,699, filed on Mar. 6, 2011, provisional application No. 61/430,545, filed on Jan. 7, 2011.

(51) Int. Cl.
| | |
|---|---|
| *H04N 19/11* | (2014.01) |
| *H04N 19/139* | (2014.01) |
| *H04N 19/159* | (2014.01) |
| *H04N 19/176* | (2014.01) |
| *H04N 19/503* | (2014.01) |
| *H04N 19/517* | (2014.01) |
| *H04N 19/56* | (2014.01) |
| *H04N 19/573* | (2014.01) |
| *H04N 19/58* | (2014.01) |
| *H04N 19/593* | (2014.01) |

(52) U.S. Cl.
CPC ......... *H04N 19/139* (2014.11); *H04N 19/159* (2014.11); *H04N 19/176* (2014.11); *H04N 19/503* (2014.11); *H04N 19/517* (2014.11); *H04N 19/56* (2014.11); *H04N 19/573* (2014.11); *H04N 19/58* (2014.11); *H04N 19/593* (2014.11)

(58) Field of Classification Search
CPC .... H04N 19/503; H04N 19/517; H04N 19/56; H04N 19/573; H04N 19/58; H04N 19/593; H04N 19/132; H04N 19/109; H04N 19/122; H04N 19/70; H04N 19/91
See application file for complete search history.

REFERENCE PICTURE 1    REFERENCE PICTURE 0    CURRENT PICTURE

METHOD FOR ENCODING AND DECODING IMAGE INFORMATION AND DEVICE USING SAME

This application is a continuation of U.S. patent application Ser. No. 17/377,203, filed Jul. 15, 2021, which is a continuation of U.S. patent application Ser. No. 16/893,093, filed Jun. 4, 2020, now allowed, which is a continuation of U.S. patent application Ser. No. 16/256,533, filed Jan. 24, 2019, now U.S. Pat. No. 10,715,825, which is a continuation of U.S. patent application Ser. No. 15/883,280, filed Jan. 30, 2018, now U.S. Pat. No. 10,257,535, which is a continuation of U.S. patent application Ser. No. 14/692,147, filed Apr. 21, 2015, now U.S. Pat. No. 9,918,101, which is a continuation of U.S. patent application Ser. No. 13/977,144, filed Jun. 28, 2013, now U.S. Pat. No. 9,924,188, which is a National Stage of International Application No. PCT/KR2012/000170, filed Jan. 6, 2012, which claims the benefit of U.S. Provisional Application No. 61/543,296, filed Oct. 4, 2011, U.S. Provisional Application No. 61/449,699, filed Mar. 6, 2011, and U.S. Provisional Application No. 61/430,545, filed Jan. 7, 2011, all of which are hereby incorporated by reference in their entirety for all purposes as if fully set forth herein.

TECHNICAL FIELD

The present invention relates to video compression technology, and more particularly, to inter-prediction technology.

BACKGROUND ART

The need for videos having high resolution and high quality has recently been increasing in various fields. As the resolution and quality of a picture is improved, however, the amount of data in the video is also likewise increased. Accordingly, if video data is transmitted using a medium such as an existing wired/wireless broadband line, or video data is stored using an existing storage medium, the costs of transmitting and storing data are also increased. In order to effectively transmit, store, and play information within a picture having high resolution and high quality, video compression technology utilizing high efficiency can be used.

In order to improve video compression efficiency, inter-prediction and intra-prediction can be used. In inter-prediction, pixel values within a current picture are predicted from a picture that is temporally anterior and/or posterior to the current picture. In intra-prediction, pixel values within a current picture are predicted using pixel information within the current picture.

In addition to the inter-prediction and intra-prediction methods, weight prediction technology for preventing picture quality from being deteriorated due to a change of lighting, entropy encoding technology for allocating a short sign to a symbol having high frequency of appearance and allocating a long sign to a symbol having low frequency of appearance, etc. are being used for the efficient processing of information within a picture.

DISCLOSURE

Technical Problem

The present invention provides a method and apparatus for improving coding efficiency and performance in inter-prediction.

The present invention also provides a method and apparatus for efficiently deriving motion information on a current block when skip mode of inter-prediction is applied to the current block.

The present invention also provides a method and apparatus for deriving motion information on a current block, for example, a reference index based on motion information on neighbor blocks when skip mode of inter-prediction is applied to the current block.

The present invention also provides a method of deriving the reference index of a temporal merge candidate for a current block.

Technical Solution (1) An embodiment of the present invention relates to a method of coding video information, including performing inter-prediction on a current block, performing entropy coding on information on the inter-prediction, and signaling the entropy-coded information, wherein in the performing of the inter-prediction, skip mode or merge mode may be applied to the current block and a reference index of the current block may be determined based on the reference indices of blocks neighboring the current block.

(2) In (1), in the signaling of the entropy-coded information, motion information on the current block may be directly transmitted.

(3) In (2), the transmitted motion information may include the reference index of the current block.

(4) In (2), the motion information may be transmitted in any one of a slice unit, a picture unit, a target prediction block unit, and a coding unit.

(5) In (1), in the performing of the inter-prediction, any one of pieces of motion information on the neighbor blocks of the current block may be determined as motion information on the current block, and in the signaling of the entropy-coded information, the motion information of the current block indicates whether the motion information of the current block is any one of the pieces of motion information on the neighbor blocks.

(6) In (1), in the performing of the inter-prediction, the reference index of the current block may be compared with each of the reference indices of the neighbor blocks of the current block, and a reference index having the smallest value as a result of the comparison may be determined as the reference index of the current block.

(7) In (6), the neighbor blocks having the reference indices compared with the reference index of the current block may include left blocks and top blocks other than corner blocks, from among the neighbor blocks of the current block.

(8) Another embodiment of the present invention relates to a method of decoding video information, including performing entropy decoding on received information, performing inter-prediction on a current block based on the entropy-decoded information, and reconstructing a picture by using a result of the prediction, wherein in the performing of the inter-prediction, skip mode or merge mode may be applied to the current block and motion information on the current block may be determined based on pieces of motion information on blocks neighboring the current block.

(9) In (8), the received information may include an indicator indicating that the motion information on any one of the neighbor blocks of the current block will be used, and in the performing of the inter-prediction, the motion information of the current block may be determined based on the indicator.

(10) In (9), the indicator indicates that the reference index of any one of the neighbor blocks of the current block will be used as the reference index of the current block.

(11) In (9), the information indicating the reference index may be transmitted in any one of a slice unit, a picture unit, a target prediction block unit, and a coding unit.

(12) In (8), the reference index of a temporal merge candidate of the current block may be determined based on available neighbor blocks from among the neighbor blocks, and in the performing of the inter-prediction, a reference index having the smallest value, from among the reference indices of the available neighbor blocks, may be determined as the reference index of the temporal merge candidate.

(13) In (12), the neighbor blocks of the current block may include a left-bottom corner block, a left-bottom block, a right-top corner block, a right-top block, and a left-top corner block of the current block.

(14) In (8), the reference index of the left-bottom block, from among a left-bottom corner block, a left-bottom block, a right-top corner block, a right-top block, and a left-top corner block of the current block may be designated as the reference index of a temporal merge candidate of the current block.

(15) In (14), in the performing of the inter-prediction, if the availability of the left-bottom block is determined and the left-bottom block is not available as a result of the determination, a reference index having a specific value may be designated as the reference index of the temporal merge candidate value.

Advantageous Effects

In accordance with the present invention, when skip mode of inter-prediction is applied, coding efficiency may be improved by effectively selecting a reference picture. In accordance with the present invention, the degree of complexity may be reduced and coding efficiency may be improved by effectively deriving the reference index of a temporal merge candidate.

MODE FOR INVENTION

Figure 1:
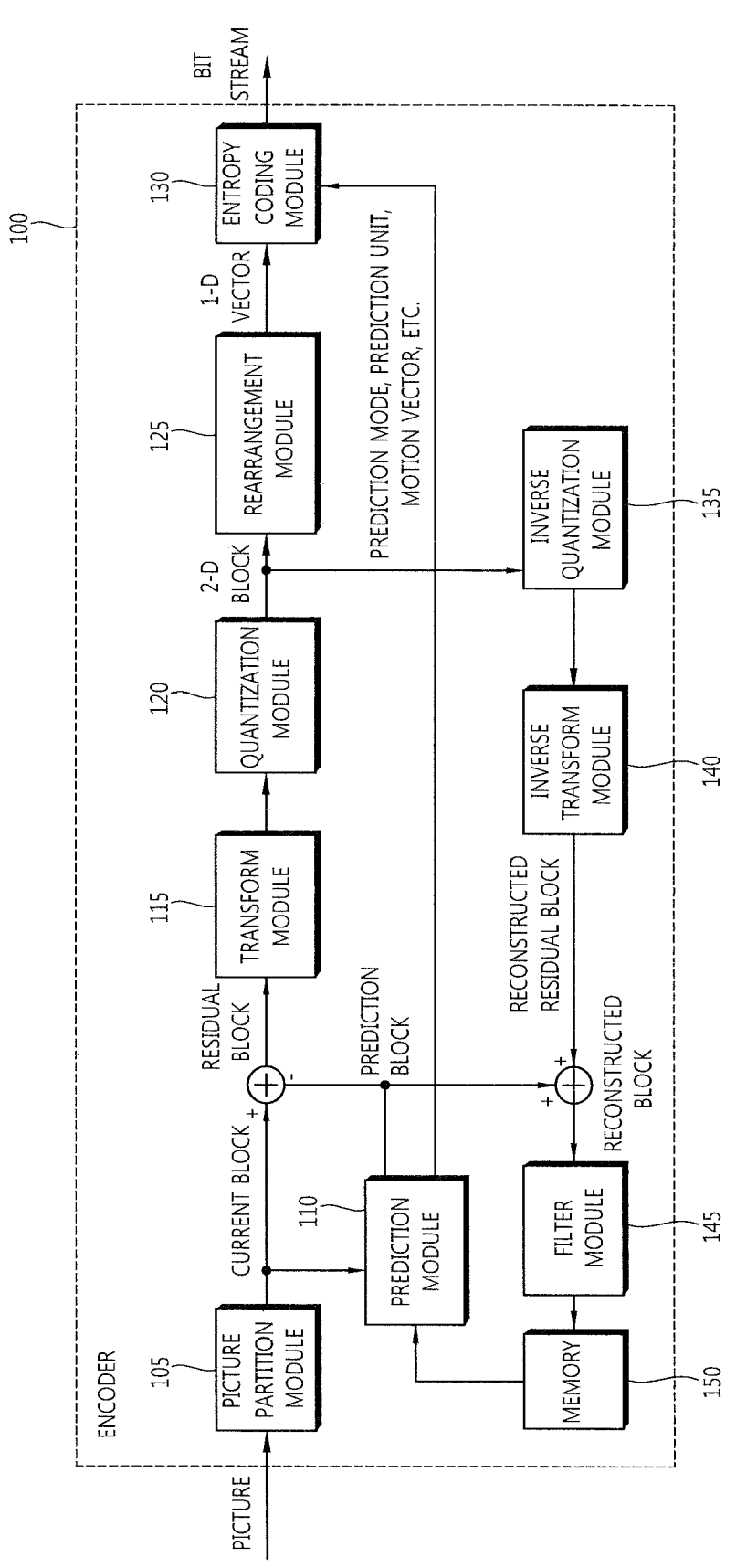
FIG. 1 is a block diagram schematically showing an encoder in accordance with an embodiment of the present invention.

The present invention may be modified in various ways, and the present invention may have several embodiments. Specific embodiments of the present invention are illustrated in the drawings and described in detail. However, the present invention is not limited only to the specific embodiments given. The terms used in this specification are used to describe only the specific embodiments and are not intended to restrict the technical scope of the present invention. An expression referencing a singular value additionally refers to a corresponding expression of the plural number, unless explicitly limited otherwise by the context. In this specification, terms such as "comprise" or 'have", are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof.

Meanwhile, elements in the drawings described in the present invention are independently illustrated for convenience of description regarding the different characteristics and functions of the encoder and decoder, but this does not indicate that each of the elements is implemented using separate hardware or separate software. For example, two or more of the elements may be combined to form one element, and one element may be divided into a plurality of elements. It is to be noted that embodiments in which some elements are integrated into one combined element and/or an element is separated into multiple separate elements are included in the scope of the present invention, given that they do not depart from the essence of the present invention.

Hereinafter, some exemplary embodiments of the present invention are described in detail with reference to the accompanying drawings. Hereinafter, the same reference numerals will designate the same elements throughout the drawings, and redundant description of the same elements is omitted.

FIG. 1 is a block diagram schematically showing an encoder in accordance with an embodiment of the present invention. Referring to FIG. 1, the encoder 100 includes a picture partition module 105, a prediction module 110, a transform module 115, a quantization module 120, a rearrangement module 125, an entropy coding module 130, an inverse quantization module 135, an inverse transform module 140, a filter module 145, and memory 150.

The picture partition module 105 may partition an input picture into one or more processing units. The processing unit may be a prediction unit (hereinafter referred to as a 'PU'), a transform unit (hereinafter referred to as a 'TU'), or a coding unit (hereinafter referred to as a 'CU'). In this specification, however, a prediction unit may be represented as a prediction block, a transform unit may be represented as a transform block, and a coding unit may be represented as a coding block, for convenience of description.

The prediction module 110 includes an inter prediction module for performing inter-prediction and an intra prediction module for performing intra-prediction, as will be described later. The prediction module 110 generates a prediction block by performing prediction on the processing unit of a picture from the picture partition module 105. The processing unit of the picture in the prediction module 110 may be a CU, a TU, or a PU. Furthermore, the prediction module 110 may determine whether prediction performed on a corresponding processing unit is inter-prediction or intra-prediction and determine the detailed content (e.g., prediction mode) of each prediction method. Here, the processing unit on which prediction is performed, the prediction method, and the processing unit whose detailed contents are determined may be different types of units. For example, the prediction method and prediction mode may be determined in a PU, and prediction may be performed in a TU.

The prediction block may be generated by performing the prediction based on information on at least one of a picture anterior to the current picture and/or a picture posterior to the current picture through inter-prediction. Furthermore, the prediction block may be generated by performing the prediction based on information found in pixels within the current picture by way of intra-prediction.

In inter-prediction, a reference picture for a PU may be selected, and a reference block having the same size as the PU may be selected in an integer pixel sample unit. Next, a prediction block that has a minimum residual signal corresponding to the above PU and has a minimum motion vector size is generated. A skip mode, merge mode, and motion vector prediction (MVP) may be used for the intra-prediction method. The prediction block may be generated in a sample unit smaller than an integer, such as a ½ pixel sample unit and a ¼ pixel sample unit. Here, the motion vector may be represented in a unit smaller than an integer pixel. For example, a luma pixel may be represented in a ¼ pixel unit, and a chroma pixel may be represented in a ⅛ pixel unit.

Pieces of information on the index of the reference picture, a motion vector (e.g., a motion vector predictor), and a residual signal selected through inter-prediction are subject to entropy coding and transferred to the decoder.

If intra-prediction is performed, a prediction mode may be determined in a PU and prediction may further be performed in a PU. Furthermore, a prediction mode may be determined in a PU and intra-prediction may be performed in a TU.

In intra-prediction, a prediction mode may have 33 directional prediction modes and two or more non-directional modes. The non-directional modes may include DC prediction modes and planar modes.

In intra-prediction, a prediction block may be generated after applying a filter to a reference sample. Here, whether or not to apply the filter to the reference sample may be determined depending on the intra-prediction mode and/or size of a current block. Here, the current block may be a transform unit on which prediction is performed. Meanwhile, in this specification, to use a pixel means to use information on the pixel, for example, a pixel value. It is to be noted that an expression 'use information on a pixel' or 'use a pixel value' may be simply represented as 'use a pixel', for convenience of description. A detailed intra-prediction method is described later.

A PU may have a variety of sizes and forms. For example, in the case of inter-prediction, a PU may have a size such as 2N×2N, 2N×N, N×2N, or N×N. In the case of intra-prediction, a PU may have a size such as 2N×2N or N×N (N is an integer in the above two examples). Here, a PU having the N×N size may be set to be exclusively applied to a specified case. For example, a PU having any given N×N size may be applied to only a minimum size coding unit or may be used only in intra-prediction. In addition to the PUs having the above-described sizes, a PU having a size, such as N×mN, mN×N, 2N×mN, or mN×2N (m<1), may be further defined and used.

A residual value (or a residual block or a residual signal) between the generated prediction block and an original block is inputted to the transform module 115.

Furthermore, information on prediction mode and information on the motion vector that are used for the prediction, together with the residual value, are coded in the entropy coding module 130 and transferred to the decoder.

The transform module 115 generates a transform coefficient by performing transformation on the residual block in the transform unit. The transform unit referenced by the transform module 115 may be a TU, and the transform unit may have a quad tree structure. Here, the size of the transform unit may be determined within a range having maximum and minimum values. The transform module 115 may transform the residual block using discrete cosine transform (DCT) and/or discrete sine transform (DST).

The quantization module 120 may generate quantization coefficients by quantizing the residual values transformed by the transform module 115. The quantization coefficients calculated by the quantization module 120 are provided to the inverse quantization module 135 and the rearrangement module 125.

The rearrangement module 125 rearranges the quantization coefficients provided by the quantization module 120. By rearranging the quantization coefficients, coding efficiency in the entropy coding module 130 may be improved. The rearrangement module 125 may rearrange the quantization coefficients of a two-dimensional block form to quantization coefficients of a one-dimensional vector form using a coefficient scanning method.

The rearrangement module 125 may change the order of coefficient scanning based on the probability statistics of the quantization coefficients received from the quantization module 120, so that entropy coding efficiency in the entropy coding module 130 is improved.

The entropy coding module 130 may perform entropy coding on the quantization coefficients rearranged by the rearrangement module 125. A coding method, such as exponential Golomb, context-adaptive variable length coding (CAVLC), or context-adaptive binary arithmetic coding (CABAC), may be used in the entropy coding. The entropy coding module 130 may code various pieces of information, such as information on the quantization coefficients and block type of a CU received from the rearrangement module 125 and the prediction module 110, information on prediction mode, information on a partition unit, information on a PU, information on a transmission unit, information on a motion vector, information on a reference picture, information on the interpolation of a block, and filtering information.

Furthermore, the entropy coding module 130 may apply a specific change to a received parameter set or syntax as needed.

The inverse quantization module 135 performs inverse quantization on the values quantized by the quantization module 120, and the inverse transform module 140 performs inverse transform sampling on the values inversely quantized by the inverse quantization module 135. The residual values generated from the inverse quantization module 135 and the inverse transform module 140 may be merged with the prediction block predicted by the prediction module 110, thereby being capable of generating a reconstructed block.

The filter module 145 may apply a deblocking filter, an adaptive loop filter (ALF), and a sample adaptive offset (SAO) to a reconstructed picture.

The deblocking filter may remove block distortion occurring in the boundary of the blocks in the reconstructed picture. The ALF may perform filtering based on a value obtained by comparing the given picture, reconstructed after the block is filtered by the deblocking filter, with the original picture. The ALF may be utilized only in instances of high efficiency. The SAO restores a difference between the offset of the residual block to which the deblocking filter has been applied and the offset of the original picture in a pixel unit, and the SAO is applied in the form of a band offset or an edge offset.

Meanwhile, the filter module 145 may not apply filtering on a reconstructed block used in inter-prediction.

The memory 150 may store the reconstructed block or picture calculated through the filter module 145. The reconstructed block or picture stored in the memory 150 may be provided to the prediction module 110 for performing inter-prediction.

Figure 2:
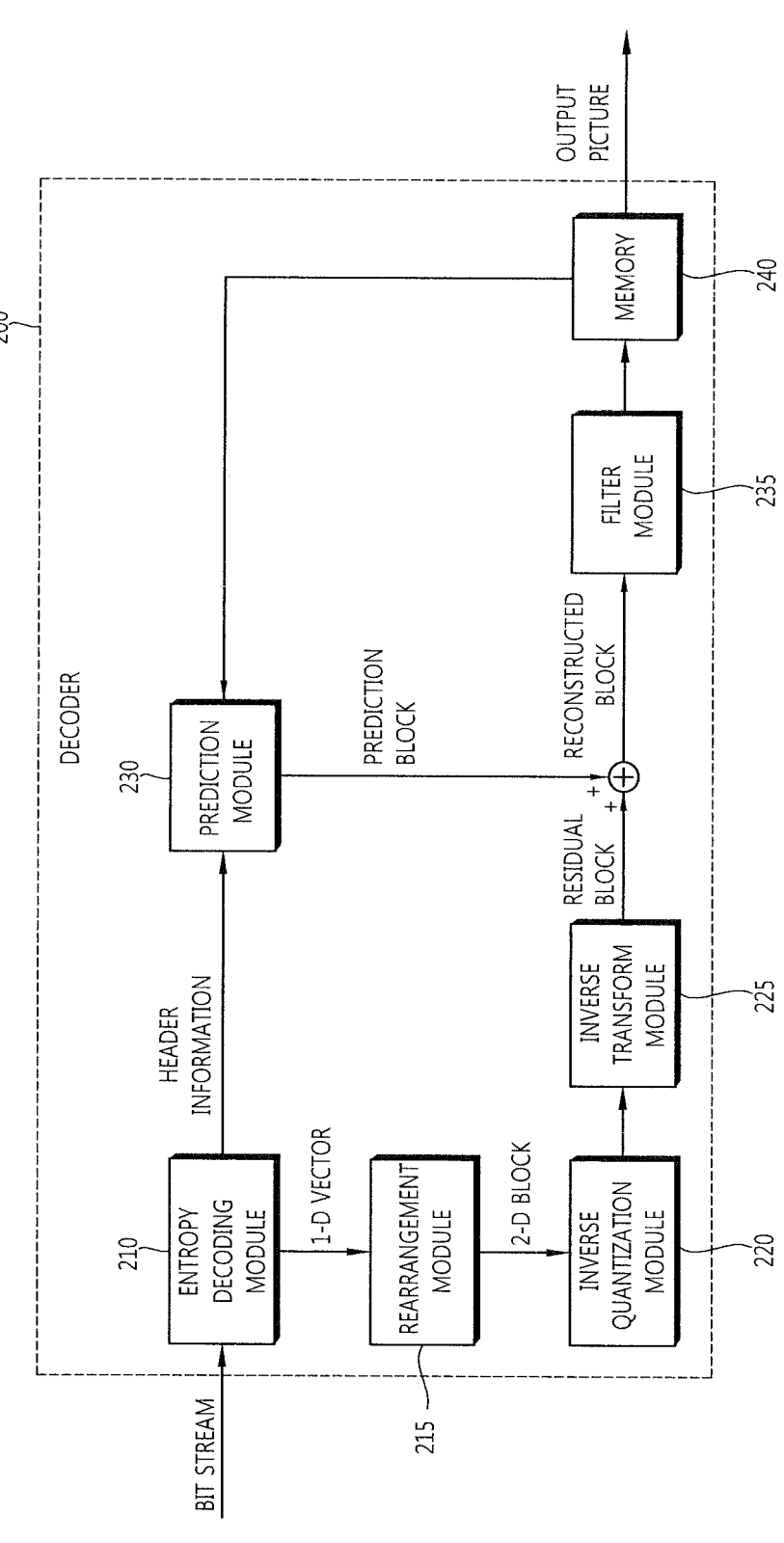
FIG. 2 is a block diagram schematically showing a decoder in accordance with an embodiment of the present invention.

FIG. 2 is a block diagram schematically showing a decoder in accordance with an embodiment of the present invention. Referring to FIG. 2, the decoder 200 may include an entropy decoding module 210, a rearrangement module 215, an inverse quantization module 220, an inverse transform module 225, a prediction module 230, a filter module 235, and memory 240.

When a video bit stream is received from the encoder, the input video bit stream may be decoded according to a procedure by which video information has been processed by the encoder.

For example, if variable length coding (hereinafter referred to as 'VLC'), such as CAVLC, has been used in order for the encoder to perform entropy coding, the entropy decoding module 210 may perform entropy decoding by implementing the same VLC table as that used in the encoder. Furthermore, if the encoder has used CABAC in order to perform entropy coding, the entropy decoding module 210 may perform entropy decoding using CABAC.

Information for generating a prediction block, from among pieces of information decoded by the entropy decoding module 210, may be provided to the prediction module 230. Residual values on which entropy decoding has been performed by the entropy decoding module may be inputted to the rearrangement module 215.

The rearrangement module 215 may rearrange the bit streams on which entropy decoding has been performed by the entropy decoding module 210 based on a rearrangement method used in the encoder. The rearrangement module 215 may rearrange coefficients represented in a one-dimensional vector form by reconstructing the coefficients into coefficients of a two-dimensional block form. The rearrangement module 215 may receive information related to coefficient scanning performed by the encoder and perform rearrangement using an inverse scanning method based on a scanning order performed by the corresponding coding unit.

The inverse quantization module 220 may perform inverse quantization based on quantization parameters and coefficient values of a block provided by the encoder.

The inverse transform module 225 may perform inverse DCT and/or inverse DST on DCT and DST performed by the transform unit of the encoder, relative to quantization results performed by the encoder. Inverse transform sampling may be performed in a transmission unit or a partition unit of a picture as determined by the encoder. In the transform module of the encoder, DCT and/or DST may be selectively performed based on a plurality of factors, such as a prediction method, the size of the current block, and a prediction direction. The inverse transform module 225 of the decoder may perform inverse transform sampling based on transform information resulting from the transform module of the encoder.

The prediction module 230 may generate a prediction block based on information related to the generation of the prediction block provided by the entropy decoding module 210 and information on a previously decoded block and/or picture provided by memory 240. A reconstructed block may be generated using the prediction block generated by the prediction module 230 and the residual block provided by the inverse transform module 225. If the prediction mode used for the current PU is an intra-prediction mode, intra-prediction for generating a prediction block may be performed based on the information found in pixels within the current picture.

If prediction mode for the current PU is inter-prediction mode, inter-prediction for the current PU may be performed based on information that is included in at least one of a picture anterior to the current picture and a picture posterior to the current picture. Here, motion information necessary for the inter-prediction for the current PU provided by the encoder, for example, information on a motion vector and the index of a reference picture, may be derived by checking a skip flag and a merge flag that are received from the encoder.

The reconstructed block and/or picture may be provided to the filter module 235. The filter module 235 applies deblocking filtering, a sample adaptive offset (SAO) and/or adaptive loop filtering to the reconstructed block and/or picture.

The memory 240 may store the reconstructed picture or block so that the reconstructed picture or block may be used as a reference picture or a reference block and may also supply the reconstructed picture to an output module.

Meanwhile, if inter-prediction mode is applied, there is advanced MVP (AMVP) as a method of performing prediction for a current block. The AMVP method is the improvement of a conventional motion vector predictor (MVP). In this method, information for inter-prediction is derived from blocks neighboring a current block.

Figure 3:
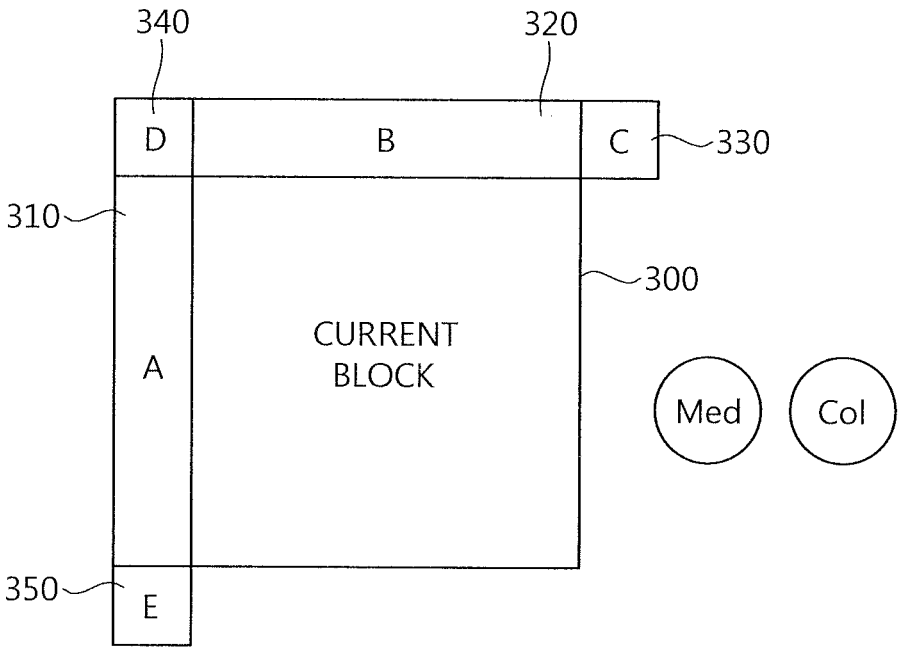
FIG. 3 is a diagram schematically illustrating an example in which inter-prediction is performed on a current block by using AMVP.

FIG. 3 is a diagram schematically illustrating an example in which inter-prediction is performed on a current block by using AMVP. Referring to FIG. 3, candidate MVPs which may be used as the MVPs of a current block 300 may be derived from neighbor blocks.

For example, a motion vector mvA may be derived from a set of blocks A 310 on the left of the current block 300. mvA is a motion vector having the same reference index as the current block 300, from among the motion vectors of block that belong to the set A 310. Next, a motion vector mvB may be derived from a set of blocks B 320 above the current block 300. mvB is a motion vector having the same reference index as the current block 300, from among the motion vectors of blocks that belong to the set B 320.

Next, a median my median of the motion vector mvC of a block C at a corner of the current block, the motion vector mvA of the set of blocks A 310, and the motion vector mvB of the set B 320 is derived as in Equation 1.

$$mv\_median = median(mvA, mvB, mvC) \qquad \text{<Equation 1>}$$

The most efficient motion vector, selected from the derived motion vectors mvA, mvB, and mvC, the median mv_median, and the motion vector my of the temporal collocated block of the current block, may be used as a motion vector to be used as the MVP of the current block.

Here, AMVP may be performed using only a specific block without taking all the blocks of the set A 310 and the set B 320 into consideration.

Figure 4:
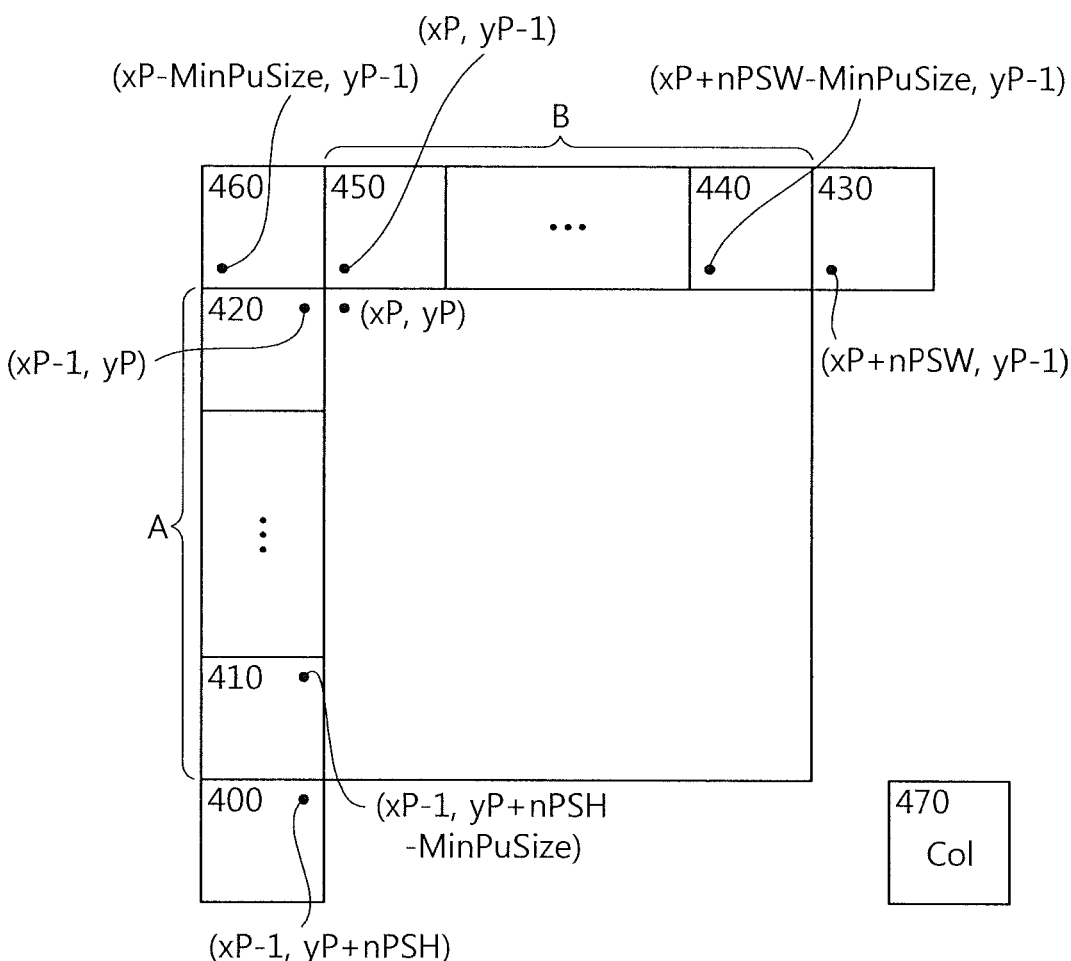
FIG. 4 is a diagram schematically illustrating an example of a method of performing AMVP by using a specific block.

FIG. 4 is a diagram schematically illustrating an example of a method of performing AMVP by using a specific block.

In the example of FIG. 4, the location of a pixel placed at the left top of a current prediction unit may be defined as (xP, yP) and the width and height of the current prediction unit may be defined as parameters nPSW and nPSH, respectively. Furthermore, in order to represent spatial candidate prediction blocks, the size of the smallest prediction unit which may be used as a prediction unit may be defined as MinPuSize.

Furthermore, as the spatial neighbor prediction blocks of the current prediction block, a block including a pixel at a location (xP−1, yP+nPSH) may be called a left first block 400 corresponding to a block E 350 of FIG. 3, for convenience of description. Furthermore, any one of blocks from a block belonging to the set A, for example, a block 420 including a pixel at a location (xP−1, yP) to a block 410 including a pixel at a location (xP−1, yP+nPSH-MinPuSize) may be called a left second block.

A block including a pixel at a location (xP+nPSW, yP−1) may be called a top first block 430 corresponding to a block C 330 of FIG. 3. Furthermore, any one of blocks from a block belonging to the set B, for example, a block 450 at a location (xP, yP−1) to a block 440 including a pixel at a location (xP+nPSW-MinPuSize, yP−1) may be called as a top second block. Furthermore, a block including a pixel at a location (xP-MinPuSize, yP−1) may be called a top third block 460 corresponding to a block D 340 of FIG. 3.

The spatial candidate prediction blocks may include the left first block, the left second block, the top first block, the top second block, and the top third block. Here, for convenience of description, the block 410 including the pixel at the location (xP−1, yP+nPSH-MinPuSize) is used as the left second block, and the block 440 including the pixel at the location (xP+nPSW-MinPuSize, yP−1) is used as the top second block.

One group including the left first block 400 and the left second block 410 is defined as a first spatial candidate prediction group, and one group including the top first block 430, the top second block 440, and the top third block 460 is defined as the second spatial candidate prediction group. A term called a spatial candidate prediction block may be used as a term that includes the blocks included in the first spatial candidate prediction group and the blocks included in the second spatial candidate prediction group.

A temporal candidate prediction block 470 may become a prediction block including the pixel at the location (xP+nPSW, yP+nPSH) in the collocated picture of the current prediction block on the basis of the location (xP, yP) of a picture included in the current prediction block or a prediction block including a pixel at a location (xP+nPSW/2, yP+nPSH/2) if the prediction block including the pixel at the location (xP+nPSW, yP+nPSH) is not available.

The locations of the spatial candidate prediction blocks shown in FIG. 4 and the number thereof and the location of the temporal candidate prediction block shown in FIG. 4 and the number thereof are random. The location and number of spatial candidate prediction blocks and the location and number of temporal candidate prediction blocks may be changed without departing from the gist of the present invention. For example, all or some of the blocks of the set A and the set B of FIG. 3 may be taken into consideration. When configuring a candidate prediction motion vector list, the location of a prediction block and a candidate prediction group that are first scanned may be changed. Furthermore, in FIG. 4, each of the prediction blocks may be a prediction unit PU.

Figure 5:
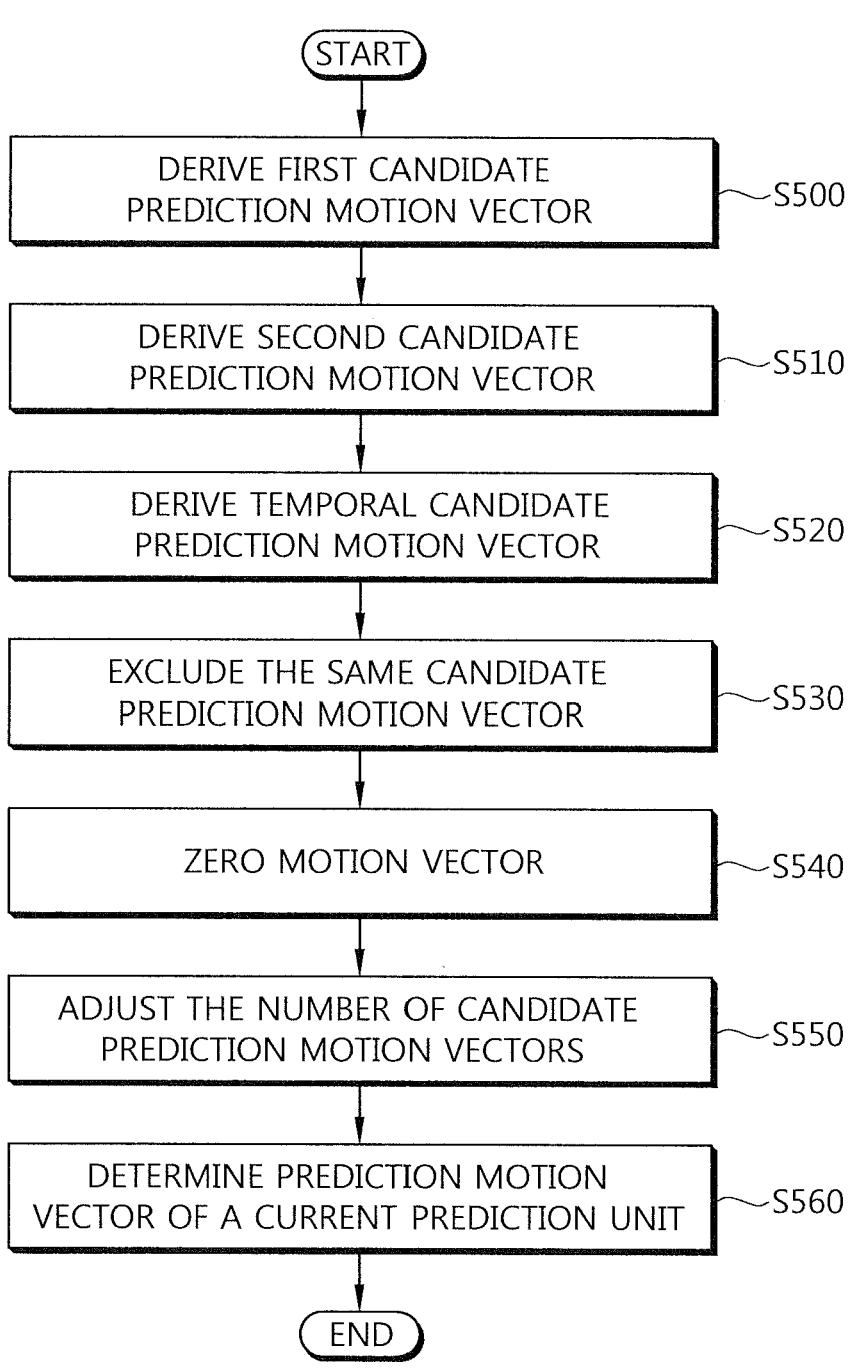
FIG. 5 is a flowchart illustrating an example of a method deriving a prediction motion vector for a current block of the decoder.

FIG. 5 is a flowchart illustrating an example of a method of the decoder deriving a prediction motion vector for a current block. The method described with reference to FIG. 5 may be performed by the decoder or a specific module, for example, the prediction module of the decoder. It is assumed that the subject for performing the method of FIG. 5 is the decoder, for convenience of description.

Referring to FIG. 5, the decoder may derive a first candidate prediction motion vector at step S500. The first candidate prediction motion vector is a candidate prediction motion vector derived from the first spatial candidate prediction group and may be derived on the basis of information on the availability of the first spatial candidate prediction group.

The first spatial candidate prediction group may include a left first block and a left second block as described in connection with the example of FIG. 4. The information on the availability of the first spatial candidate prediction group may be used to derive the prediction motion vector from the first spatial candidate prediction group. The information on the availability of the first spatial candidate prediction group indicates whether at least one of the motion vectors of blocks included in the first spatial candidate prediction group is an available candidate prediction motion vector or not. That is, the information on the availability of the first spatial candidate prediction group indicates whether at least one of the motion vectors of the blocks included in the first spatial candidate prediction group may be included in the candidate prediction motion vector list of a current prediction block or not.

The decoder may derive a second candidate prediction motion vector at step S510. The second candidate prediction motion vector is a candidate prediction motion vector derived from the second spatial candidate prediction group and may be derived on the basis of information on the availability of the second spatial candidate prediction group.

The second spatial candidate prediction group may include a top first block, a top second block, and a top third block as described above. The information on the availability of the second spatial candidate prediction group may be used to derive the prediction motion vector from the second spatial candidate prediction group. The information on the availability of the second spatial candidate prediction group, like the information on the availability of the first spatial candidate prediction group, indicates whether at least one of the motion vectors of blocks included in the second spatial candidate prediction group may be included in the candidate prediction motion vector list of the current prediction block or not.

The decoder may obtain a temporal candidate prediction motion vector at step S520. The temporal candidate prediction motion vector is a candidate prediction motion vector derived from a temporal candidate prediction block on the basis of the information on the availability of the temporal candidate prediction block.

The information on the availability of the temporal candidate prediction block indicates whether the motion vector of the temporal candidate prediction block will be included in the candidate prediction motion vector list of the current prediction block.

The candidate prediction motion vector list may include at least one of the motion vectors obtained through the steps S500 to S520, that is, the first candidate prediction motion vector, the second candidate prediction motion vector, and the temporal candidate prediction motion vector.

The decoder may exclude the same candidate prediction motion vectors from the candidate prediction motion vector list at step S530. More particularly, if the same candidate prediction motion vectors are present in the candidate prediction motion vector list, the decoder removes the remaining candidate prediction motion vectors other than a candidate prediction motion vector having the highest priority, from among the same candidate prediction motion vectors, from the candidate prediction motion vector list.

Only a different prediction motion vector obtained through the step S530 of determining whether the candidate prediction motion vectors are identical with each other or not, from among the candidate prediction motion vectors obtained through the steps S500 to S520, may be included in the candidate prediction motion vector list.

The decoder may add a zero motion vector to the candidate prediction motion vector list at step S540. More particularly, if a necessary number of candidate prediction motion vectors are not derived in order to use the candidate prediction motion vector list, the decoder may add the zero motion vector to the candidate prediction motion vector list. The step S540 may be integrally performed along with a step S550 to be described later. In this case, the step S540 may not be performed.

The decoder may adjust the number of candidate prediction motion vectors at step S550. More particularly, the decoder determines whether or not the number of candidate prediction motion vectors included in a current candidate prediction motion vector list is equal to or greater than the maximum number of candidate prediction motion vectors that may be included in the candidate prediction motion vector list.

The number of candidate prediction motion vectors that may be included in the candidate prediction motion vector list may be limited to a specific number. For example, assuming that the maximum number of candidate prediction motion vectors is set to 2 and the number of candidate prediction motion vectors derived through the steps S500 to S540 is 3, only two candidate prediction motion vectors in order of high priority may be included in the candidate prediction motion vector list and the remaining one candidate prediction motion vector may be excluded from the candidate prediction motion vector list.

As described above, if the number of candidate prediction motion vectors included in a current candidate prediction motion vector list is equal to or greater than the maximum number of candidate prediction motion vectors that may be included in the candidate prediction motion vector list, the decoder adjusts the number of candidate prediction motion vectors so that only the number of candidate prediction motion vectors equal to the maximum number of candidate prediction motion vectors is included in the prediction motion vector list. Here, a method of including the number of candidate prediction motion vectors equal to the maximum number of candidate prediction motion vectors in the candidate prediction motion vector list in order of high priority and excluding the remaining candidate prediction motion vectors from the candidate prediction motion vector list may be used as an example of a method of adjusting the number of candidate prediction motion vectors.

If the number of candidate prediction motion vectors included in the current candidate prediction motion vector list is smaller than the maximum number of candidate prediction motion vectors that may be included in the candidate prediction motion vector list, the decoder may add a candidate prediction motion vector to the candidate prediction motion vector list. For example, the zero motion vector may be added to a current candidate prediction motion vector list as an additional candidate prediction motion vector. The added candidate prediction motion vector may become a combination of vectors already present in the candidate prediction motion vector list or a scaled value in addition to the zero motion vector.

The decoder may determine a prediction motion vector of the current prediction block at step S560. The decoder may use the most efficient candidate prediction motion vector, from among the candidate prediction motion vectors included in the candidate prediction motion vector list, as a motion vector predictor (mvp) of the current prediction block, as described above with reference to FIG. 3.

Here, the encoder may transfer information on the most efficient candidate prediction motion vector to the decoder. In this case, the decoder may determine the motion vector predictor of a current prediction unit on the basis of the information on the index of the motion vector predictor received from the encoder. The information on the index of the motion vector predictor may indicate that which of the candidate prediction motion vectors included in the candidate prediction motion vector list will be used as the motion vector predictor of a current prediction block.

Information on the motion vector of the current prediction unit may be obtained by adding information on a motion vector difference (mvd), that is, information on a difference between the motion vector predictor of the current prediction block and the original motion vector value of the current prediction block.

Figure 6:
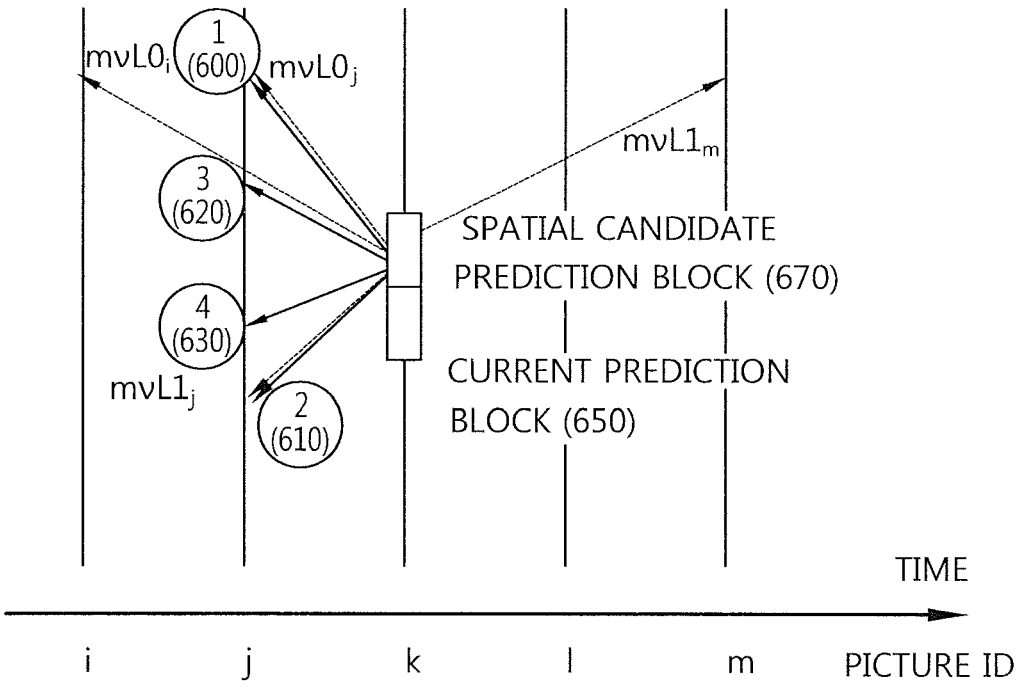
FIG. 6 is a diagram schematically illustrating an example of the motion vector of a spatial candidate prediction block for a current prediction block.

FIG. 6 is a diagram schematically illustrating an example of the motion vector of a spatial candidate prediction block for a current prediction block.

Referring to FIG. 6, it is assumed that the motion vector of a spatial candidate prediction block obtained from the same reference index and reference picture list as those of a current prediction block is a first motion vector 600. Here, the reference index indicates a reference picture.

In the example of FIG. 6, assuming that a reference picture indicated by the reference index of a current prediction block 650 is a j picture and a reference picture list including the j picture is L0, the motion vector of the spatial candidate prediction block 670 and the motion vector of the current prediction block 650 have the same reference picture and the same reference picture list because a picture indicated by the motion vector 600 of a spatial candidate prediction block 670 is a j picture and a reference picture list including the j picture is L0. As described above, a motion vector, having the same reference picture (or the same reference index) as that of the current prediction block and derived from the same list, is called the first motion vector 600.

In contrast, a motion vector of the spatial candidate prediction block 670, having the same reference index as that of the current prediction block 650 and derived from a different reference picture list, is called a second motion vector 610.

Assuming that a reference picture indicated by the reference index of the current prediction block 650 is a j picture and a reference picture list including the j picture is L0, the motion vector 610 of the spatial candidate prediction block 670 and the motion vector of the current prediction block 650 have the same reference index (or the same reference picture), but are derived from different reference picture lists because a picture indicated by the motion vector 610 of the spatial candidate prediction block 670 is a j picture and a reference picture list including the j picture is L1 in the example of FIG. 6. As described above, a motion vector, having the same reference index as that of a current prediction block, but derived from a different reference picture list, is called the second motion vector 610.

Furthermore, a motion vector of a spatial candidate prediction block, having a different reference index from a current prediction block, but derived from the same reference picture list, is called a third motion vector 620.

Assuming that a reference picture indicated by the reference index of the current prediction unit 650 is a j picture and a reference picture list including the j picture is L0, the motion vector of the spatial candidate prediction block 670 and the motion vector of the current prediction block 650 have different reference indices, but are derived from the same reference picture list because a picture indicated by the motion vector 620 of the spatial candidate prediction block 670 is an i picture and a reference picture list including the i picture is L0 in the example of FIG. 6. As described above, a motion vector, having a different reference index from that of the current prediction block 650, but derived from the same list, is called the third motion vector 620. Since the reference picture (or the reference index) of the third motion vector 620 are different from those of the current prediction block 650, the motion vector of the spatial candidate prediction block 670 may be scaled on the basis of the reference picture of the current prediction block 650 and then included in a candidate prediction motion vector list.

A motion vector of the spatial candidate prediction block 670, having a different reference index from that of the current prediction block 650 and derived from a different reference picture list, is called a fourth motion vector 630.

Assuming that a reference picture indicated by the reference index of the current prediction block 650 is a j picture and a reference picture list including the j picture is L0, the motion vector of the spatial candidate prediction block 670 and the motion vector of the current prediction block 650 have different reference indices and have different reference picture list because a picture indicated by the motion vector 630 of the spatial candidate prediction block 670 is an m picture and a reference picture list including the m picture is L1 in the example of FIG. 6. As described above, a motion vector, having a different reference index from that of a current prediction block and derived from a different reference picture list, is called the fourth motion vector 630. Even in this case, since the fourth motion vector 630 has a different reference index (or reference picture) from that of the current prediction block 650, the motion vector of the spatial candidate prediction block is scaled on the basis of the reference picture of the current prediction block 650 and then included in a candidate prediction motion vector list.

The decoder may search a left first block and a left second block for the first motion vector, the second motion vector, the third motion vector, and the fourth motion vector sequentially. The decoder may search the left first block for the first motion vector and the second motion vector. If, as a result of the search, the first motion vector and the second motion vector are not retrieved, the decoder may search the left second block for the first motion vector and the second motion vector. In another embodiment, the decoder may search the left first block and the left second block sequentially for the first motion vector. If, as a result of the search, the first motion vector is not retrieved, the decoder may search the left first block and the left second block sequentially for the second motion vector.

If the first motion vector and the second motion vector are not retrieved, the decoder may search the left first block and the left second block for the third motion vector and the fourth motion vector likewise.

If a motion vector is retrieved, the decoder may set information on the availability of a first spatial candidate prediction group to 1 (i.e., true), include the retrieved motion vector in a candidate prediction motion vector list, and terminate subsequent searches.

The decoder may search an above first block, an above second block, and an above third block sequentially for the first motion vector, the second motion vector, the third motion vector, and the fourth motion vector. The search method is the same as that for left blocks. If a motion vector is retrieved, the decoder may set information on the availability of a second spatial candidate prediction group to 1 (i.e., true), include the retrieved motion vector in a candidate prediction motion vector list, and terminate subsequent searches.

Here, the third motion vector and the fourth motion vector need to be scaled in order to include the third and the fourth motion vectors in the candidate prediction motion vector list and use them. In this case, the number of times of scaling may be limited. For example, if the predetermined number of times has been fully used to search the left first block and the second block for the third motion vector and the fourth motion vector, a search for the third motion vector and the fourth motion vector in the above blocks may not be performed.

The decoder may include a candidate prediction motion vector, derived from a temporal candidate prediction block (i.e., a Col block), in the candidate prediction motion list.

As described above, if the same candidate prediction motion vectors are included in the candidate prediction motion list, the decoder may remove the remaining candidate prediction motion vectors other than a candidate prediction motion vector having the highest priority, from among the same candidate prediction motion vectors, from the candidate prediction motion list. Furthermore, the decoder may adjust the number of candidate prediction motion vectors by using a zero motion vector, etc.

Meanwhile, in the above contents, L0 and L1 refer to reference picture lists used in inter-prediction depending on the type of picture.

Pictures used in video coding and decoding may be classified into an I picture, a P picture, and a B picture.

The I picture is independently coded within a corresponding frame irrespective of frames anterior and posterior to the corresponding frame and is not subject to prediction in the time direction. Only information within the corresponding frame is used in coding processing.

The P picture may be coded by inter-prediction in one direction using one reference picture. The P picture requires one reference picture list, and the one reference picture list is called a reference picture list 0 L0. Inter-prediction using a reference picture selected from L0 is also called L0 prediction. The L0 prediction is chiefly used in forward prediction. In the P picture, the intra-prediction or the L0 prediction may be performed.

The B picture may be coded by forward, backward, or bi-direction inter-prediction by using one or more reference pictures, for example, two reference pictures. The B picture requires two reference pictures lists, and the two reference pictures list are called a reference picture list 0 L0 and a reference picture list 1 L1, respectively. As described above, inter-prediction using a reference picture selected from L0 is called L0 prediction, and the L0 prediction is chiefly used in forward prediction. Inter-prediction using a reference picture selected from L1 is called L1 prediction, and the L1 prediction is chiefly used in backward prediction. Furthermore, inter-prediction using two reference pictures selected from the respective L0 and L1 is also called bi-prediction.

In the B picture, the intra-prediction, the L0 prediction, the L1 prediction, or the bi-prediction may be performed.

A picture having the same L0 and L1, from among B pictures, is called generalized P and B (GPB) or a generalized B picture. In the case of GPB, only forward prediction is allowed and coding having high coding performance, but having low delay is possible.

Figure 7:
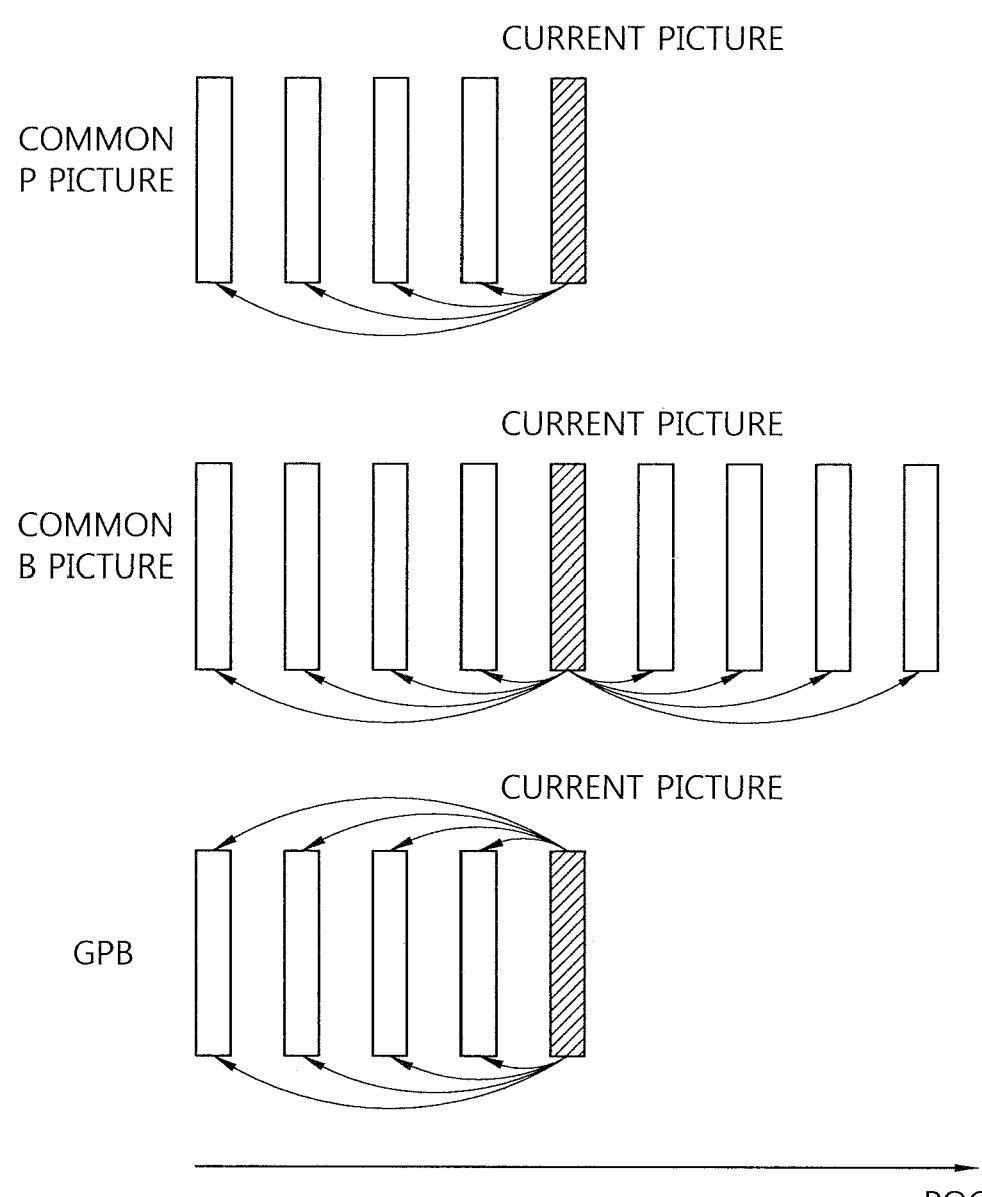
FIG. 7 is a diagram schematically illustrating a method of predicting a P picture, a B picture, and GPB.

FIG. 7 is a diagram schematically illustrating a method of predicting a P picture, a B picture, and GPB. In FIG. 7, the pictures are shown in order of picture order count (POC). The POC means the display order or time order of pictures.

In relation to the P picture, unidirectional prediction from one reference picture is possible. Accordingly, in time order (in POC), forward prediction from the past picture may be performed and backward prediction from the future picture may be performed as shown in FIG. 7. In the P picture, only one piece of motion information (i.e., a motion vector or a reference index) about a target prediction block in one direction may be used.

In relation to the B picture, a maximum of two pieces of motion information may be used. Accordingly, forward prediction may be performed using the past two reference pictures on the basis of a B picture, backward prediction may be performed using the future two reference pictures on the basis of a B picture, and bi-prediction may be performed using the past one reference picture and the future one reference picture on the basis of a B picture. A B picture capable of performing bi-prediction may need two reference picture lists L0 and L1.

In the GPB, like in the B picture, prediction may be performed on a target prediction block by using two or more pieces of motion information. In the GPB, only forward prediction may be allowed. In this case, delay due to backward prediction is not accompanied.

The characteristics of the I picture, the P picture, and the B picture may be defined for every slice not for every picture. For example, in a slice unit, an I slice having the characteristics of the I picture, a P slice having the characteristics of the P picture, and a B slice having the characteristics of the B picture may be defined. In a slice unit, the GPB may be said to be a GPB slice or a generalized B slice.

Meanwhile, in the aforementioned AMVP method, when skip mode is applied to a current block, the current block is decoded using a derived motion vector predictor (mvp). For example, when skip mode is applied in inter-prediction, motion information on a specific available reference block, from among reference blocks neighboring a current block, is derived and used as motion information on the current block. A residual for a prediction block is not transmitted, and the current block is decoded on the basis of the prediction block.

In skip mode, the reference index of a current block may be assigned as a specific value, for example, 0. In this case, however, if a temporal motion vector predictor (TMVP) is used, it is difficult to obtain effective prediction results.

Figure 8:
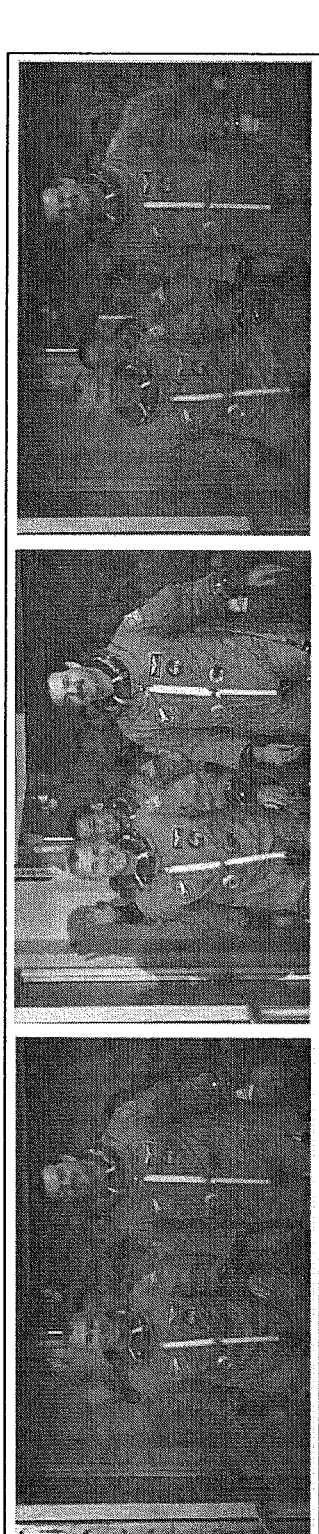
FIG. 8 is a diagram schematically illustrating a problem that may occur when a reference index is set to 0 and skip mode is applied.

FIG. 8 is a diagram schematically illustrating a problem that may occur when a reference index is set to a specific value and skip mode is applied.

FIG. 8 shows an example in which a reference index is set to a specific value and skip mode is applied. In the example of FIG. 8, it is assumed that the reference index indicates a reference picture 0. The reference picture 0 indicated by the reference index is brighter than a reference picture 1 indicated by a reference index 1 and a current picture. The reason why the reference picture 0 is brighter may result from a lighting effect, such as a flash when photographing is performed.

A difference between the luminance components of the current picture and the reference picture 0 is great. Thus, if coding efficiency is taken into consideration, the reference picture 1 rather than the reference picture 0 may be preferably used to predict the current picture.

Accordingly, in the example of FIG. 8, blocks neighboring the current block have a good possibility that they may have a reference index indicative of the reference picture 1. If most of the neighbor blocks have the reference picture 1 and skip mode is applied to the current block by using the reference picture 0, a motion vector predictor (mvp) for the current block may have to be determined using the block of a zero motion vector or a collocated picture because there is no candidate block having the same reference index from the more similar motin vector.

That is, although there is a neighbor block having a more similar motion vector, a problem may arise because skip mode must be applied using different information.

Accordingly, when skip mode is applied, a deriving method using the reference indices of blocks neighboring a current block without designating a specific value as a reference index may be used. For example, the problem may be solved using a method of allocating reference indices, distributed over a lot close to the current block, as reference indices for skip mode. In other words, a reference index to be allocated to skip mode may be determined by tracking a motion information of the neighbor blocks of the current block.

Embodiments regarding the allocation of a reference index to skip mode in accordance with the present invention are described in more detail below with reference to the accompanying drawings.

In a system to which the present invention is applied, as described above, from among motion vectors and reference indices assigned to a current block in skip mode, a specific reference index is not assigned 0, but reference indices distributed over a lot close to the current block are designated as the reference indices of the current block. That is, the reference index of a specific block, from among blocks neighboring the current block, is used as the reference index of the current block, and detailed methods thereof are described in connection with the following embodiments.

Embodiment 1 Regarding the Designation of a Reference Index in Skip Mode

In the present embodiment, the reference index that is used the most, from among the reference indeices of blocks neighboring a current block, is used as the reference index of the current block.

For example, referring to FIG. 3, a reference index that is the largest in number, from among the reference indices of blocks belonging to the set A 310, the reference indices of blocks belonging to the set B 320, the reference index of the block C 330, and the reference index of the block E 350, may be used as the reference index of the current block 300. Here, if the block C 330 is not available, the reference index of the block D 340 may be used instead.

If a plurality of reference indices that are designated the most (i.e., used the most) is present in neighbor blocks, a reference index having a smaller value may be designated as the reference index of a current block. Here, the reference index having a smaller value may be a reference index having higher priority. Or, the reference index having a smaller value may be a reference index indicative of a reference picture having a lower index in a reference picture list.

Embodiment 2 Regarding the Designation of a Reference Index in Skip Mode

In the present embodiment, a median for the reference indices of left blocks neighboring a current block and a median for the reference indices of top blocks neighboring the current block are derived. a median for the two medians and the reference index of a block located at the corner of the current block are designated as the reference index of the current block.

For example, referring to FIG. 3, it is assumed that a Median (refidxA1, . . . , refidxAN) for the reference indices refidxA1, . . . , refidxAN of N blocks belonging to the set A 310 are called refA. It is also assumed that a Median (refidxB1, . . . , refidxBM) for the reference indices refB1, . . . , refidxBN of M blocks belonging to the set B 320 is called refB. Furthermore, assuming that the reference index of the block C 330 is refC, a Medians (refA, refB, and refC) may be designated as the reference index of the current block 300.

Like in the embodiment 1, if the block C 330 is not available, for example, if the block C 330 is a block in intra-prediction mode, the reference index of the block D 340 or the reference index of the block E 350 may be used instead of the reference index of the block C 330.

Embodiment 3 Regarding the Designation of a Reference Index in Skip Mode

In the present embodiment, a reference index having the smallest value, from among the reference indices of neighbor blocks located at the top of a current block, and a reference index having the smallest value, from among the reference indices of neighbor blocks on the left of the current block, are derived. A reference index having a smaller value, from among the two reference indices, is designated as the reference index of the current block.

For example, referring to FIG. 3, a reference index having the smallest value, from among the reference indices of blocks belonging to the set A 310, is designated as the reference index refA of the set A, and a reference index having the smallest value, from among the reference indices of blocks belonging to the set B 320, is designated as the reference index refB of the set B. Here, a reference index having a smaller value, from among the reference indices refA and refB, is designated as the reference index of the current block 300.

Here, the reference indices of the three blocks located at the corners of the current block 300, that is, the reference index refC of the block C 330, the reference index refD of the block D 340, and the reference index refE of the block E, may be further included as the reference index of the current block 300. A reference index having the smallest value, from among the reference indices refA, refB, refC, refD, and refE, may be designated as the reference index of the current block 300.

Embodiment 4 Regarding the Designation of a Reference Index in Skip Mode

In the present embodiment, the encoder may send a reference index (or a reference picture index) to be used in a current block to which skip mode is applied through a parameter set of a slice level or a picture level. Here, the current block may be a coding unit or a prediction unit.

Information on the reference index that is transmitted by the encoder in a slice level or a picture level may be a value itself of the reference index.

Meanwhile, in the present invention, since reference indices distributed over a lot close to a current block are designated as reference indices for skip mode, reference indices transmitted by the encoder may be the reference indices of blocks that neighbor the current block. Accordingly, the encoder may not directly send the value of a reference index, but send information on the reference index in such a way as to send information indicative of a neighbor block having the corresponding reference index. In this case, if the motion vector of a block designated by the encoder is the same as that of the current block, motion information on the block designated by the encoder may be used without change and skip mode may be applied to the current block. This method may also be called a method of merging neighbor blocks with a current block and applying skip mode to the current block, for convenience of description.

The decoder designates the reference indices, received from the encoder, as the reference indices of blocks to which skip mode is applied. Since the reference indices for skip mode are transmitted in a slice level or a picture level, the same reference index may be assigned to the blocks to which skip mode is applied, that is, blocks belonging to the same slice or the same picture. The decoder derives a motion vector predictor (mvp) for a current block by using reference indices received from the encoder and an AMVP method, such as that described above. Here, if information on a reference index received from the encoder is transferred in such a way as to indicate a neighbor block having the same reference index as described above and the motion vector of the indicated neighbor block is the same as the motion vector of a current block, the decoder may apply skip mode to the current block in such a way as to use motion information on the indicated neighbor block without change. That is, a method of merging the neighbor block with the current block and applying skip mode to the current block may be used.

Embodiment 5 Regarding the Designation of a Reference Index in Skip Mode

In the present embodiment, the encoder sends a reference index to be used by a current block to which skip mode is applied for every block. Here, a block through which the reference index is transmitted may be a coding unit or a prediction unit.

Information on the reference index transmitted by the encoder for every block may be a value itself of the reference index.

Meanwhile, in the present invention, since reference indices distributed over a lot close to a current block are designated as reference indices for skip mode, reference indices received from the encoder may be the reference indices of blocks that neighbor the current block. Accordingly, the encoder may not directly send the value of a reference index, but send information on the reference index in such a way as to send information indicative of a neighbor block having the corresponding reference index. In this case, if the motion vector of a block designated by the encoder is the same as that of the current block, motion information on the block designated by the encoder may be used without change and skip mode may be applied to the current block. This method may also be called a method of merging neighbor blocks with a current block and applying skip mode to the current block, for convenience of description.

When applying skip mode to a current block, the decoder uses a reference index, transmitted by the encoder, as the reference index of the current block. Here, if information on a reference index received from the encoder is transferred in such a way as to indicate a neighbor block having the same reference index as described above and the motion vector of the indicated neighbor block is the same as the motion vector of a current block, the decoder may apply skip mode to the current block in such a way as to use motion information on the indicated neighbor block without change. That is, a method of merging the neighbor block with the current block and applying skip mode to the current block may be used.

Embodiment 6 Regarding the Designation of a Reference Index in Skip Mode

In the present embodiment, in order to derive a reference index for skip mode applied to a current block, a reference index having the smallest value, from among the reference indices of neighbor blocks, is selected and used.

Figure 9:
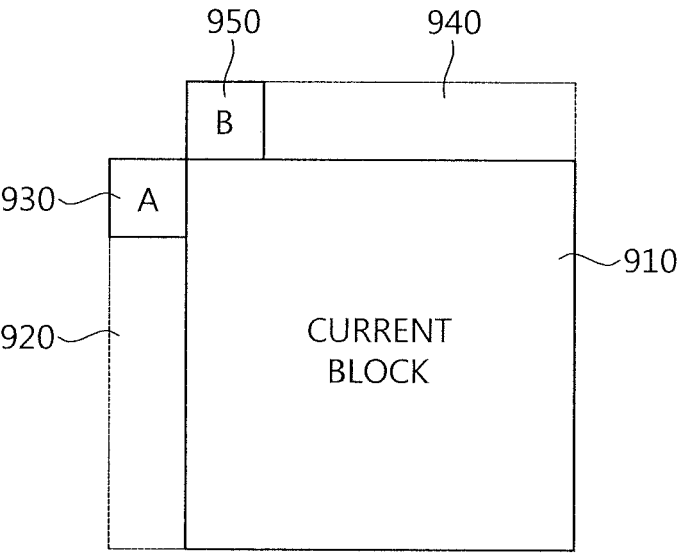
FIG. 9 is a diagram schematically illustrating a method of selecting the reference index of a current block from the reference indices of neighbor blocks in accordance with an embodiment of the present invention.

FIG. 9 is a diagram schematically illustrating a method of selecting the reference index of a current block from the reference indices of neighbor blocks in accordance with an embodiment of the present invention.

Referring to FIG. 9, when skip mode is applied to a current block 910, the reference index of the current block 910 may be determined by taking the reference index of a block A 930 and the reference index of a block B 950 into consideration. Referring to FIG. 3, the block A 930 may be any one of the blocks of a set A 920, and the block B 950 may be any one of the blocks of a set B 940.

Each of the reference index of the block A 930 and the reference index of the block B 950 may have a value of −1 (i.e., unavailable) for a reference picture list L1 in the case of forward prediction and may have a value of −1 for a reference picture list L0 in the case of backward prediction. Furthermore, if the block A 930 or the block B 950 is in intra-mode, all the values of reference picture indices may become −1 in relation to bi-direction prediction.

Table 1 shows reference picture indices that are designated according to the embodiment 6 regarding the designation of a reference index in skip mode.

TABLE 1

| ref_idx_A | ref_idx_B | | | |
|---|---|---|---|---|
| | −1 | 0 | 1 | n |
| −1 | 0 or −1 | 0 | 1 | n |
| 0 | 0 | 0 | 0 | 0 |
| 1 | 1 | 0 | 1 | 1 |
| n | n | 0 | 1 | n |

A reference index for skip mode is obtained for each of an L0 direction and an L1 direction, and prediction is performed using a derived reference index. Basically, a reference index having a smaller value, from among the reference index of the block A 930 and the reference index of the block B 950, is designated as the reference index of a current block. Accordingly, a reference index skip_ref in skip mode may be derived as in Equation 2 by using the reference index ref idx_A of the block A 930 and the reference index ref idx_B of the block B 950.

$$skip\_ref\_A=(ref\_idx\_A==-1?0:ref\_idx\_A)$$

$$skip\_ref\_B=(ref\_idx\_B==-1?0:ref\_idx\_B)$$

$$skip\_ref=min(skip\_ref\_A,skip\_ref\_B) \qquad <Equation\ 2>$$

If both the reference index of the block A 930 and the reference index of the block B 950 are −1, the reference index of a current block in skip mode may be derived as 0 or −1.

If a reference index in skip mode is derived as −1, skip mode may be predicted in one direction. For example, if a value of a skip mode reference index skip_rel_l0 in an L0 direction is −1 and a value of a skip mode reference index in an L1 direction is 0, skip mode in the L1 direction is applied to a current block.

Meanwhile, if intra-prediction mode for a current block is merge mode, a predictin may be performed in such a way as to apply motion information (i.e., a reference index and a motion vector) on a predetermined merge candidate to the current block may be predicted in such a way as to apply merge mode to the current block. Furthermore, if intra-prediction mode for a current block is skip mode, skip of merge mode may be applied to the current block as described above. This may be simply called merge skip mode.

In merge mode or merge skip mode, motion information on a designated candidate block is used as motion information on a current block. In merge skip mode, unlike in merge mode, a residual signal for a prediction block is not transmitted. Information indicating whether merge mode or merge skip mode is applied to a current block may be transmitted by the encoder.

If intra-prediction mode for a current block is merge mode or merge skip mode, an indicator transmitted by the encoder may indicate a target with which the current block will be merged in a merge candidate list mergeCandList.

Figure 10:
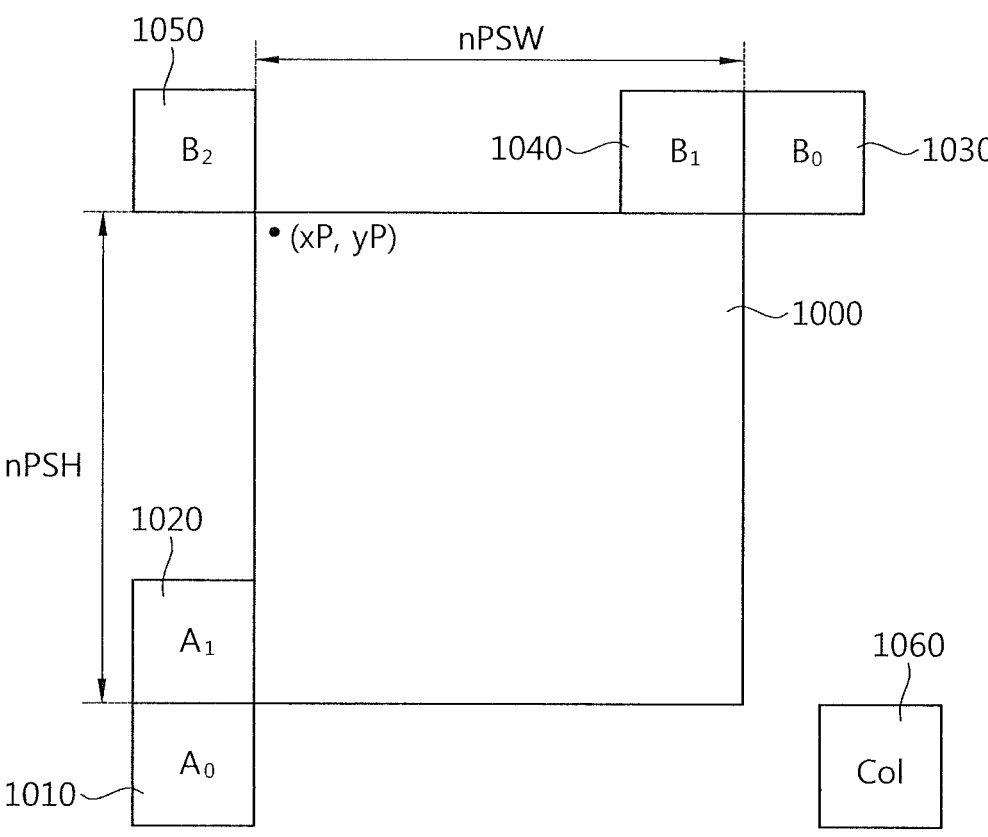
FIG. 10 is a diagram schematically illustrating merge candidates in a system to which the present invention is applied.

FIG. 10 is a diagram schematically illustrating merge candidates in a system to which the present invention is applied. Referring to FIG. 10, if merge mode or merge skip mode is applied to a current block 1000, candidates that may be used as motion information on the current block includes pieces of motion information on a block $A_0$ 1010, that is, the left-bottom corner block of the current block, a block $A_1$ 1020, that is, the left-bottom block of the current block, a block $B_0$ 1030, that is, the right-top corner block of the current block, a block $B_1$ 1040, that is, the right-top block of the current block, a block $B_2$ 1050, that is, the left-top corner block of the current block, and a block COL 1050, that is, a block at the same location as the current block. Here, $A_1$, $B_0$, $B_1$, $B_2$, or COL may indicate a block or motion information. Hereinafter, for convenience of description, $A_1$, $B_0$, $B_1$, $B_2$, or COL is indicated by a 'block N' ($N=A_1$, $B_0$, $B_1$, $B_2$, or COL) when it indicates a block itself and $A_1$, $B_0$, $B_1$, $B_2$, or COL is indicated by 'N' ($N=A_1$, $B_0$, $B_1$, $B_2$, or COL) when it indicates motion information (candidate).

A merge candidate list may be indexed in order of $A_1$, $B_1$, $B_0$, $A_0$, $B_2$, and COL when a value of an availability flag for each candidate is 1 (true). A candidate including an availability flag having a value not 1 may not be included in the merge candidate list.

If the number of candidates having the same motion information and the same reference index is two or more in a merge candidate list, the remaining candidates other than a candidate having lower order (or higher priority or lower index), from among the candidates having the same motion information and the same index, may be removed from the merge candidate list.

Furthermore, the maximum number of candidates that may be included in a merge candidate list may be fixed to a specific number. For example, only a maximum number of 5 candidates may be included in a merge candidate list.

A current block to which merge mode or merge skip mode is applied is merged with a candidate block indicated by an index transmitted by the encoder in a merge candidate list, and the current block uses motion information on the candidate block as its motion information. Here, the motion information of the candidate block used as the motion information of the current block can include a prediction flag indicative of the availability of L1/L2 in addition to a motion vector and a reference index.

A method of deriving $A_0$, $A_1$, $B_0$, $B_1$, or $B_2$ as a merge candidate is performed by determining the availability of each candidate.

Referring to FIG. 10, the block $A_0$, the block $A_1$, the block $B_0$, the block $B_1$, and the block $B_2$ cover (xP−1, yP+nPSH), (xP−1, yP+nPSH−1), (xP+nPSW, yP−1), (xP+nPSW−1, yP−1), and (xP−1, yP−1), respectively. Here, the location of each block may be indicated by (xN, yN), for convenience of description.

In the following cases for the spatial merge candidates $A_0$, $A_1$, $B_0$, $B_1$, and $B_2$, the corresponding candidates are not available:

(1) When all blocks $A_0$, $A_1$, $B_0$, and $B_1$ are available, $B_2$.

(2) Motion information on a block in intra-mode, from among the block $A_0$, the block $A_1$, the block $B_0$, the block $B_1$, and the block $B_2$.

(3) When the partition type of a current block is PART_2N×N, PART_2 N×nU, PART 2N×nD, PART_N×2N, PART_nL×2N, or PART_nR×2N, the partition index of the current block is 1, and prediction units that cover a block having a partition index 0 and a location (xN, yN) have the same motion information, motion information on a block N.

(4) When the partition type of a current block is PART_N×N, the same motion information is assigned to a block having a partition index 0 and a block having a partition index 2, and prediction units that cover a block having a partition index 1 and a location (xN, yN) have the same motion information, motion information on a block N.

(5) When the partition type of a current block is PART_N×N, the same motion information is assigned to a block having a partition index 0 and a block having a partition index 1, and prediction units that cover a block having a partition index 2 and a location (xN, yN) have the same motion information, motion information on a block N.

In relation to a spatial merge candidate corresponding to any one of the cases (1) to (5), from among the spatial merge candidates $A_0$, $A_1$, $B_0$, $B_1$, or $B_2$, a value of an availability flag is set to 0, and the elements values of a corresponding motion vector are also set to 0.

In addition to the cases of (1) to (5), a value of an availability flag for a corresponding candidate is set to 1, and the motion vector, the reference index, and the prediction flag of a block (e.g., a prediction unit) that covers a location (xN, yN) are designated as respective mvLXN, refIdxLXN, and predFlagLXN of a merge candidate list.

Meanwhile, in merge mode and merge skip mode, a temporal merge candidate (i.e., a Col block) may be derived differently from the aforementioned spatial merge candidates. The motion vector of the temporal merge candidate may be selected at a specific location in relation to a block corresponding to a current block in a Col picture.

For example, the motion vector of a block located at the right-bottom corner of a block corresponding to a current block may be selected as the motion vector of a temporal merge candidate.

For another example, the reference index of a temporal merge candidate may be derived on the basis of the reference indices of blocks neighboring a current block without using a Col picture.

Methods of deriving the reference index of a temporal merge candidate in accordance with the present invention are described in detail below with reference to FIG. 10.

Embodiment 1 Regarding the Deriving of the Reference Index of a Temporal Merge Candidate Referring to FIG. 10, a reference index refIdxLXA (X is 0 or 1) may be derived from the block $A_1$ 1020 as follows.

If the block $A_1$ 1020 that covers the location (xP−1, yP+nPSH−1) of a sample is available and prediction mode is not intra-prediction mode MODE_INTRA, refIdxLX [xP−1, yP+nPSH−1] is assigned to the reference index refIdxLXA. The sample at the location (xP−1, yP+nPSH−1) may be a luma sample, and the block $A_1$ 1020 that covers the location (xP−1, yP+nPSH−1) of the sample and the current block 1000 may be prediction units.

If the block $A_1$ 1020 that covers the location (xP−1, yP+nPSH−1) of the sample is not available or prediction mode is intra-prediction mode MODE_INTRA, a value of −1 is assigned to the reference index refIdxLXA.

Referring to FIG. 10, a reference index refIdxLXB (X is 0 or 1) may be derived from the block $B_1$ 1040 as follows.

If the block $B_1$ 1040 that covers the location (xP+nPSW−1, yP−1) of a sample is available and prediction mode is not intra-prediction mode MODE_INTRA, refIdxLX [xP+nPSW−1, yP−1] is assigned to the reference index refIdxLXB. The sample at the location (xP+nPSW−1, yP−1) may be a luma sample, and the block $B_1$ 1040 that covers the location (xP+nPSW−1, yP−1) of the sample and the current block 1000 may be prediction units.

If the block $B_1$ 1040 that covers the location of the sample (xP+nPSW−1, yP−1) is not available or prediction mode is intra-prediction mode MODE_INTRA, a value of −1 is assigned to the reference index refIdxLXB.

Referring to FIG. 10, a reference index refIdxLXC (X is 0 or 1) may be derived from the three corner blocks $A_0$ 1010, $B_0$ 1030, and $B_2$ 1050 as follows.

If the block $B_0$ 1030 that covers the location (xP+nPSW, yP−1) of a sample is available and prediction mode is not intra-prediction mode MODE_INTRA, refIdxLX [xP+nPSW, yP−1] is assigned to the reference index refIdxLXC. The sample at the location (xP+nPSW, yP−1) may be luma sample, and the block $B_0$ 1030 that covers the location (xP+nPSW, yP−1) of the sample and the current block 1000 may be prediction units.

If the block $B_0$ 1030 is not available or prediction mode is intra-prediction mode, the block $A_0$ 1010 that covers the location (xP−1, yP+nPSH) of a sample is available, and prediction mode is not intra-prediction mode MODE_IN-TRA, refIdxLX [xP−1, yP+nPSH] is assigned to the reference index refIdxLXC. The sample at the location (xP−1, yP+nPSH) may be a luma sample, and the block A₀ 1010 that covers the location (xP−1, yP+nPSH) of the sample and the current block 1000 may be prediction units.

If the blocks B₀ and A₀ are not available or prediction mode is intra-prediction mode, the block B₂ 1050 that covers the location (xP−1, yP−1) of a sample is available, and prediction mode is not intra-prediction mode MODE_IN-TRA, refIdxLX[xP−1, yP−1] is assigned to the reference index refIdxLXC. The sample at the location (xP−1, yP−1) may be a luma sample, and the block B₂ 1050 that covers the location (xP−1, yP−1) of the sample and the current block 1000 may be prediction units.

If the blocks B₀, A₀, and B₂ are not available or prediction mode is intra-prediction mode, a value of −1 is assigned to the reference index refIdxLXC.

Here, the reference index refIdxLX of a temporal merge candidate for the current block 1000 may be derived as in the following cases.

(1) If the reference index refIdxLXA is the same as the reference index refIdxLXB, the reference index refIdxLXB is the same as the reference index refIdxLXC, and a value of the reference index refIdxLXA is −1 (unavailable), a value of the reference index refIdxLX becomes 0. If the reference index refIdxLXA is the same as the reference index refIdxLXB, the reference index refIdxLXB is the same as the reference index refIdxLXC, and a value of the reference index refIdxLXA is not −1, the reference index refIdxLX becomes the reference index refIdxLXA.

(2) As cases not corresponding to the case (1), if the reference index refIdxLXA is the same as the reference index refIdxLXB and a value of the reference index refIdxLXA is −1, the reference index refIdxLX becomes the reference index refIdxLXC. If the reference index refIdxLXA is the same as the reference index refIdxLXB and a value of the reference index refIdxLXA is not −1, the reference index refIdxLX becomes the reference index refIdxLXA.

(3) As cases not corresponding to the cases (1) and (2), if the reference index refIdxLXB is the same as the reference index refIdxLXC and a value of the reference index refIdxLXB is −1, the reference index refIdxLX becomes the reference index refIdxLXA. If the reference index refIdxLXB is the same as the reference index refIdxLXC and a value of the reference index refIdxLXB is not −1, the reference index refIdxLX becomes the reference index refIdxLXB.

(4) As cases not corresponding to the cases (1) to (3), if the reference index refIdxLXA is the same as the reference index refIdxLXC and a value of the reference index refIdxLXA is −1, the reference index refIdxLX becomes the reference index refIdxLXB. If the reference index refIdxLXA is the same as the reference index refIdxLXC and a value of the reference index refIdxLXA is not −1, the reference index refIdxLX becomes the reference index refIdxLXA.

(5) As a case not corresponding to the cases (1) to (4), if a value of the reference index refIdxLXA is −1, the reference index refIdxLX is assigned to a reference index having a smaller value, from among the reference indices refIdxLXB and refIdxLXC. That is, the reference index refIdxLX=min(refIdxLXB, refIdxLXC).

(6) As cases not corresponding to the cases (1) to (5), if a value of the reference index refIdxLXB is −1, the reference index refIdxLX is assigned to a reference index having a smaller value, from among the reference indices refIdxLXA and refIdxLXC. That is, the reference index refIdxLX=min(refIdxLXA, refIdxLXC).

(7) As a case not corresponding to the cases (1) to (6), if a value of the reference index refIdxLXC is −1, the reference index refIdxLX is assigned to a reference index having a smaller value, from among the reference indices refIdxLXA and refIdxLXB. That is, the reference index refIdxLX=min(refIdxLXA, refIdxLXB).

(8) If a case does not correspond to any one of the cases (1) to (7), the reference index refIdxLX of the temporal merge candidate is assigned to a reference index having the smallest value, from among the reference indices refIdxLXA, refIdxLXB, and refIdxLXC. That is, the reference index refIdxLX=min(refIdxLXA, refIdxLXB, refIdxLXC).

As a result, in the present embodiment, the reference index refIdxLX of the temporal merge candidate may be said to be a reference index having the smallest value, from among the reference index refIdxLXA selected from the left of the current block 1000, the reference index refIdxLXB selected from the upper side of the current block, and the reference index refIdxLXC selected as the first available reference index from the corners of the current block 1000.

Embodiment 2 Regarding the Deriving of the Reference Index of a Temporal Merge Candidate The present embodiment proposes a method of simply deriving the reference index of a temporal merge candidate for a current block when merge mode or merge skip mode is applied to the current block.

In the present embodiment, a fixed value may be used as the reference index of a temporal merge candidate for a current block. For example, in the present embodiment, the reference index refIdxLX of the temporal merge candidate may be designated as 0.

Embodiment 3 Regarding the Deriving of the Reference Index of a Temporal Merge Candidate In the present embodiment, unlike in the embodiment 2, from among the reference indices of temporal merge candidates, the reference index refIdxL0 of a reference picture list L0 is fixed to 0 and the reference index refIdxL1 of a reference picture list L1 is fixed to 1.

Accordingly, the reference index of a temporal merge candidate for a current block may be determined as in Equation 3 below.

$$refIdxL0=0$$
$$refIdxL1=refIdxL0+1=1 \qquad \text{<Equation 3>}$$

Embodiment 4 Regarding the Deriving of the Reference Index of a Temporal Merge candidate In the present embodiment, only the reference index refIdxLXA derived from the left of a current block and the reference index refIdxLXB derived from the upper side of the current block other than reference indices derived from the corners of the current block are taken into consideration. For example, referring to FIG. 10, a reference index having a smaller value, from among the reference index of the block $A_1$ 1020 and the reference index of the block $B_1$ 1040, may be determined as the reference index of a temporal merge candidate for the current block 1000.

More particularly, the reference index refIdxLX of the temporal merge candidate may be derived as in the following cases.

(1) If the reference index refIdxLXA is the same as the reference index refIdxLXB and a value of the reference index refIdxLXA is −1 (unavailable), a value 0 is assigned to the reference index refIdxLX. If the reference index refIdxLXA is the same as the reference index refIdxLXB and a value of the reference index refIdxLXA is not −1, the reference index refIdxLXA is designated as the reference index refIdxLX of the temporal merge candidate.

(2) As a case not corresponding to the case (1), if a value of the reference index refIdxLXA is −1, the reference index refIdxLXB is designated as the reference index refIdxLX of the temporal merge candidate.

(3) As a case not corresponding to the cases (1) and (2), if a value of the reference index refIdxLXB is −1, the reference index refIdxLXA is designated as the reference index refIdxLX of the temporal merge candidate.

(4) As a case not corresponding to the cases (1) to (3), a reference index having a smaller value, from among the reference indices refIdxLXA and refIdxLXB, is designated as the reference index refIdxLX of the temporal merge candidate.

Embodiment 5 Regarding the Deriving of the Reference Index of a Temporal Merge Candidate In the present embodiment, only in the case of low delay or when GPB is used, the same method as that of the embodiment 4 is used. In the remaining cases, a value 0 is assigned to the reference index refIdxLX of a temporal merge candidate for a current block.

More particularly, if the low delay condition (or the condition that GPB is used) is not satisfied, the reference index refIdxLX of the temporal merge candidate for the current block is set to 0.

If the low delay condition (or the condition that GPB is used) is satisfied, as in the embodiment 4, only the reference index refIdxLXA derived from the left of the current block and the reference index refIdxLXB derived from the upper side of the current block are taken into consideration. Referring to FIG. 10, the reference index refIdxLXA is the reference index of the block $A_1$ 1020, and the reference index refIdxLXB is the reference index of the block $B_1$ 1040. In this case, (1) If the reference index refIdxLXA is the same as the reference index refIdxLXB and a value of the reference index refIdxLXA is −1 (unavailable), a value of the reference index refIdxLX is set to 0. If the reference index refIdxLXA is the same as the reference index refIdxLXB and a value of the reference index refIdxLXA is not −1, the reference index refIdxLXA is designated as the reference index refIdxLX.

(2) As a case not corresponding to the case (1), if a value of the reference index refIdxLXA is −1, the reference index refIdxLXB is designated as the reference index refIdxLX.

(3) As a case not corresponding to the cases (1) and (2), if a value of the reference index refIdxLXB is −1, the reference index refIdxLXA is designated as the reference index refIdxLX.

(4) If a case does not correspond to any one of the cases (1) to (3), a reference index having a smaller value, from among the reference indices refIdxLXA and refIdxLXB, is designated as the reference index refIdxLX of a temporal merge candidate for a current block.

Embodiment 6 Regarding the Deriving of the Reference Index of a Temporal Merge Candidate In the present embodiment, the reference index refIdxLXA derived from the left of a current block is used as the reference index refIdxLX of a temporal merge candidate for the current block. Referring to FIG. 10, the reference index refIdxLXA is the reference index of the block $A_1$ 1020.

If a value of the reference index refIdxLXA is −1, the reference index refIdxLXB derived from the upper side of the current block 1000 is used as the reference index of the temporal merge candidate. Referring to FIG. 10, the reference index refIdxLXB is the reference index of the block $B_1$ 1040.

If a value of the reference index refIdxLXB is −1, the reference index refIdxLX of the temporal merge candidate is set to 0. That is, (1) if a value of the reference index refIdxLXA is −1 and a value of the reference index refIdxLXB is −1, the reference index refIdxLX of the temporal merge candidate is set to 0.

(2) If a value of the reference index refIdxLXA is −1 and a value of the reference index refIdxLXB is not −1, the reference index refIdxLX of the temporal merge candidate is designated as the reference index refIdxLXB.

(3) If a value of the reference index refIdxLXA is not −1, the reference index refIdxLX of the temporal merge candidate is designated as the reference index refIdxLXA.

Figure 11:
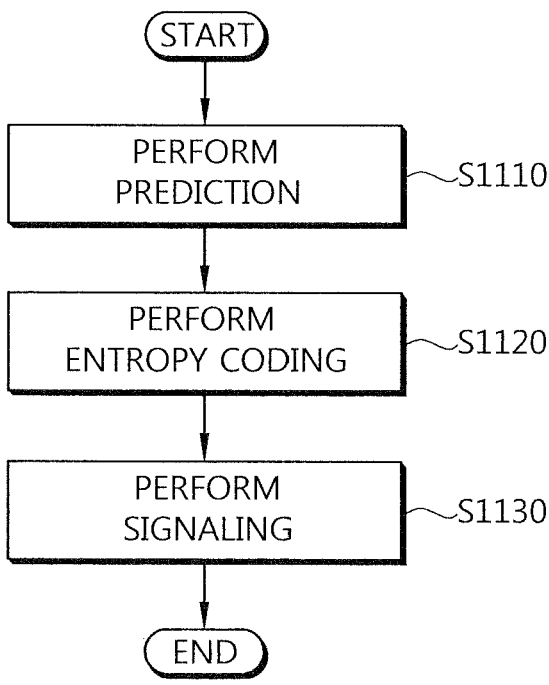
FIG. 11 is a diagram schematically illustrating an example of the operation of the encoder in a system to which the present invention is applied.

FIG. 11 is a diagram schematically illustrating an example of the operation of the encoder in a system to which the present invention is applied.

Referring to FIG. 11, the encoder performs prediction on a current block at step S1110. In order to perform the prediction, the encoder performs partition on a coding unit. The encoder determines prediction mode for the current block, that is, a prediction target, and performs the prediction in the determined prediction mode.

Prediction mode for the current block may be intra-prediction mode or inter-prediction mode. If prediction mode for the current block is inter-prediction, merge mode, (merge) skip mode, or AMVP may be applied to the current block.

If merge mode or (merge) skip mode is applied to the current block, a motion vector and a reference index of the current block may be determined using neighbor blocks.

If skip mode is applied to the current block, a reference index of the current block may be determined by taking motion information on the neighbor blocks of the current block into consideration.

Furthermore, if a specific neighbor block is selected and used as a candidate that may be merged with the current block in merge mode or (merge) skip mode, a motion vector and a reference index of the current block may be determined on the basis of motion information on the neighbor blocks of the current block.

The encoder performs the prediction on the current block on the basis of the determined motion information.

The encoder performs entropy coding on information on which the prediction has been performed at step S1120. The encoder also performs entropy coding on information necessary for decoding along with the information on the prediction. Furthermore, the entropy-coded information includes motion information on the current block in skip mode, merge mode, etc. as described above.

The encoder signals the entropy-coded information to the decoder at step S1130.

Figure 12:
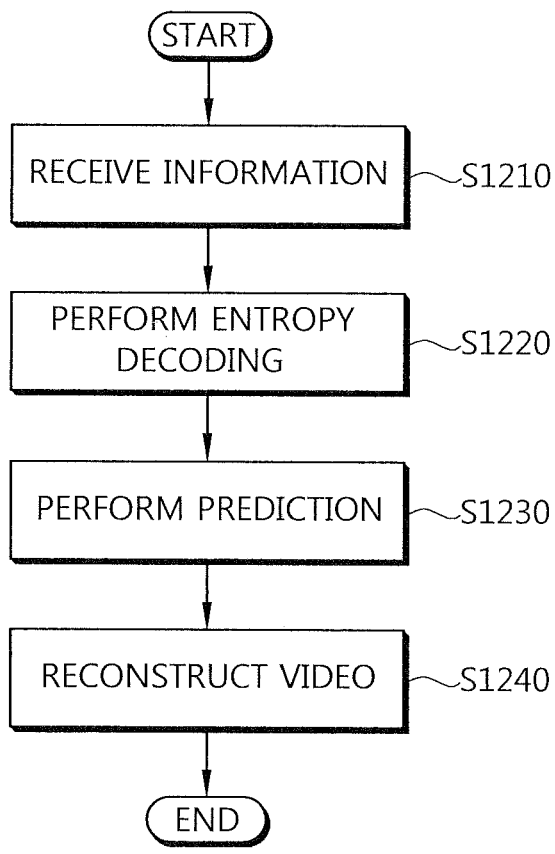
FIG. 12 is a flowchart schematically illustrating an example of the operation of the decoder in a system to which the present invention is applied.

FIG. 12 is a flowchart schematically illustrating an example of the operation of the decoder in a system to which the present invention is applied.

Referring to FIG. 12, the decoder receives coded information at step S1210. The information may have been subjected to entropy coding by the encoder and transferred through a bit stream.

The decoder performs entropy decoding on the received information at step S1220.

The decoder performs prediction on a current block on the basis of the entropy-decoded information at step S1230. The decoder performs prediction in prediction mode for the current block.

If prediction mode for the current block is inter-prediction mode and skip mode is applied to the current block, a method of deriving motion information (e.g., a motion vector and a reference index) on the current block has been described above.

The decoder reconstructs a video on the basis of the results of the prediction at step S1240.

In the above exemplary systems, although the methods have been described in the form of a series of the steps or blocks, the present invention is not limited to the sequence of the steps, and some of the steps may be performed in different order from other or may be performed simultaneously with other steps. Furthermore, the above-described embodiments include various forms of examples. Accordingly, the present invention should be construed as including all other replacements, modifications, and changes which fall within the scope of the claims.

In the above description relating to the present invention, when there is reference to one element described as being "connected to" or "coupled with" the other element, the one element may be directly connected to the other element or may be coupled with the other element, but it should be understood that a third element may be placed between the two elements. In contrast, when it is said that one element is described as being "directly connected to" or "directly coupled with" the other element, it should be understood that a third element is not placed between the two elements.

The invention claimed is:

1. An encoding method of an inter prediction, the method comprising:

determining, by an encoding apparatus, an inter prediction mode of a current block as a merge mode;

constructing, by the encoding apparatus, merge candidates including spatial merge candidates and a temporal merge candidate of the current block;

selecting, by the encoding apparatus, a merge candidate from the merge candidates;

deriving, by the encoding apparatus, motion information of the selected merge candidate as motion information of the current block, wherein the motion information includes a motion vector and a reference index;

generating, by the encoding apparatus, prediction samples of the current block based on the motion vector and a reference picture indicated by the reference index;

encoding, by the encoding apparatus, information about prediction of the current block, wherein the information about the prediction includes inter prediction mode information representing the inter prediction mode of the current block and indication information indicating the selected merge candidate among the merge candidates; and generating, by the encoding apparatus, a bitstream including the information about the prediction, wherein a value of a reference index of the temporal merge candidate is set equal to 0 regardless of any of values of reference indexes of spatial neighboring blocks and a temporal neighboring block.

2. A transmission method of data for image, the method comprising:

obtaining a bitstream of image information including information about prediction of a current block;

transmitting the data comprising the bitstream of the image information including the information about the prediction, wherein the information about the prediction is generated by performing inter prediction for the current block, encoding the information about the prediction, wherein the prediction is performed by determining an inter prediction mode of the current block as a merge mode, constructing merge candidates including spatial merge candidates and a temporal merge candidate of the current block, selecting a merge candidate from the merge candidates, deriving motion information of the selected merge candidate as motion information of the current block, wherein the motion information includes a motion vector and a reference index, generating prediction samples of the current block based on the motion vector and a reference picture indicated by the reference index, wherein the information about the prediction includes inter prediction mode information representing the inter prediction mode of the current block and indication information indicating the selected merge candidate among the merge candidates, wherein a value of a reference index of the temporal merge candidate is set equal to 0 regardless of any of values of reference indexes of spatial neighboring blocks and a temporal neighboring block.

* * * * *